(12) United States Patent
Gill

(10) Patent No.: US 9,670,725 B2
(45) Date of Patent: Jun. 6, 2017

(54) METHOD OF AUTOMATICALLY CONTROLLING MOTORIZED WINDOW TREATMENTS

(71) Applicant: Lutron Electronics Co., Inc., Coopersburg, PA (US)

(72) Inventor: Timothy Gill, Bethlehem, PA (US)

(73) Assignee: LUTRON ELECTRONICS CO., INC., Coopersburg, PA (US)

( * ) Notice: Subject to any disclaimer, the term of this patent is extended or adjusted under 35 U.S.C. 154(b) by 59 days.

(21) Appl. No.: 14/578,105

(22) Filed: Dec. 19, 2014

(65) Prior Publication Data
US 2015/0177709 A1 Jun. 25, 2015

Related U.S. Application Data

(60) Provisional application No. 61/919,874, filed on Dec. 23, 2013.

(51) Int. Cl.
*E06B 9/68* (2006.01)
*E06B 9/11* (2006.01)
*E06B 9/40* (2006.01)

(52) U.S. Cl.
CPC ........ *E06B 9/68* (2013.01); *E06B 9/11* (2013.01); *E06B 9/40* (2013.01);
(Continued)

(58) Field of Classification Search
CPC ..... E06B 2009/6827; E06B 2009/2452; E06B 2009/6818; E06B 2009/6809; E06B 9/68; E06B 9/32; Y02B 80/50
See application file for complete search history.

(56) References Cited

U.S. PATENT DOCUMENTS

| | | |
|---|---|---|
| 5,142,133 A | 8/1992 | Kern et al. |
| 5,237,169 A | 8/1993 | Grehant |

(Continued)

FOREIGN PATENT DOCUMENTS

| | | |
|---|---|---|
| DE | 9311755 U1 | 10/1993 |
| EP | 2372475 A2 | 10/2011 |

(Continued)

OTHER PUBLICATIONS

Lee et al., "Integrated Performance of an Automated Venetian Blind/Electric Lighting System in a Full-Scale Private Office", Proceedings of the ASHRAE/DOE/BTECC Conference, Thermal Performance of the Exterior Envelopes of Buildings VII, Clearwater Beach, Florida, Sep. 1998, pp. 1-25.

(Continued)

*Primary Examiner* — Blair M Johnson
(74) *Attorney, Agent, or Firm* — Condo Roccia Koptiw LLP

(57) ABSTRACT

A load control system automatically controls the amount of daylight entering a building through at least one window of a non-linear façade of the building. The load control system comprises at least two motorized window treatments located along the non-linear façade, and a system controller. The controller is configured to calculate an optimal position for the motorized window treatments at each of a plurality of different times during a subsequent time interval using at least two distinct façade angles of the non-linear façade, such that a sunlight penetration distance will not exceed a maximum distance during the time interval. The controller is configured to use the optimal positions to determine a controlled position to which both of the motorized window treatments will be controlled during the time interval and to automatically adjust each of the motorized window treatments to the controlled position at the beginning of the time interval.

34 Claims, 27 Drawing Sheets

(52) U.S. Cl.
CPC .......... *E06B 2009/6809* (2013.01); *E06B 2009/6818* (2013.01); *E06B 2009/6827* (2013.01); *E06B 2009/6845* (2013.01)

(56) References Cited

U.S. PATENT DOCUMENTS

| | | | |
|---|---|---|---|
| 5,467,266 | A | 11/1995 | Jacobs et al. |
| 5,663,621 | A | 9/1997 | Popat |
| 6,064,949 | A | 5/2000 | Werner et al. |
| 6,084,231 | A | 7/2000 | Popat |
| 6,983,783 | B2 | 1/2006 | Carmen, Jr. et al. |
| 7,019,276 | B2 | 3/2006 | Cloutier et al. |
| 7,085,627 | B2 | 8/2006 | Bamberger et al. |
| 7,111,952 | B2 | 9/2006 | Veskovic |
| 7,310,559 | B2 | 12/2007 | Walko, Jr. |
| 7,417,397 | B2 | 8/2008 | Berman et al. |
| 7,566,137 | B2 | 7/2009 | Veskovic |
| 7,588,067 | B2 | 9/2009 | Veskovic |
| 7,737,653 | B2 | 6/2010 | Carmen, Jr. et al. |
| 7,839,109 | B2 | 11/2010 | Carmen, Jr. et al. |
| 7,950,827 | B2 | 5/2011 | Veskovic |
| 7,963,675 | B2 | 6/2011 | Veskovic |
| 7,977,904 | B2 | 7/2011 | Berman et al. |
| 8,288,981 | B2 * | 10/2012 | Zaharchuk .............. E05F 17/00 318/285 |
| 8,508,169 | B2 | 8/2013 | Zaharchuk et al. |
| 8,723,466 | B2 * | 5/2014 | Chambers .............. E05F 15/79 160/166.1 |
| 8,786,236 | B2 | 7/2014 | Zaharchuk et al. |
| 2006/0207730 | A1 | 9/2006 | Berman et al. |
| 2008/0236763 | A1 | 10/2008 | Kates |
| 2008/0283621 | A1 | 11/2008 | Quirino et al. |
| 2009/0020233 | A1 | 1/2009 | Berman et al. |
| 2009/0065598 | A1 | 3/2009 | Quirino et al. |
| 2009/0222137 | A1 | 9/2009 | Berman et al. |
| 2009/0240381 | A1 | 9/2009 | Lane |
| 2009/0254222 | A1 | 10/2009 | Berman et al. |
| 2010/0071856 | A1 | 3/2010 | Zaharchuk et al. |
| 2012/0001487 | A1 | 1/2012 | Pessina |
| 2013/0063065 | A1 * | 3/2013 | Berman .............. H04L 12/2827 318/480 |
| 2015/0177709 | A1 * | 6/2015 | Gill .................. G05B 11/01 160/7 |

FOREIGN PATENT DOCUMENTS

| | | |
|---|---|---|
| EP | 2590095 A1 | 5/2013 |
| WO | WO 2011/014657 A1 | 2/2011 |

OTHER PUBLICATIONS

Lee et al., "Low-Cost Networking for Dynamic Window Systems", Energy and Buildings, vol. 36, 2004, pp. 1-13.

* cited by examiner

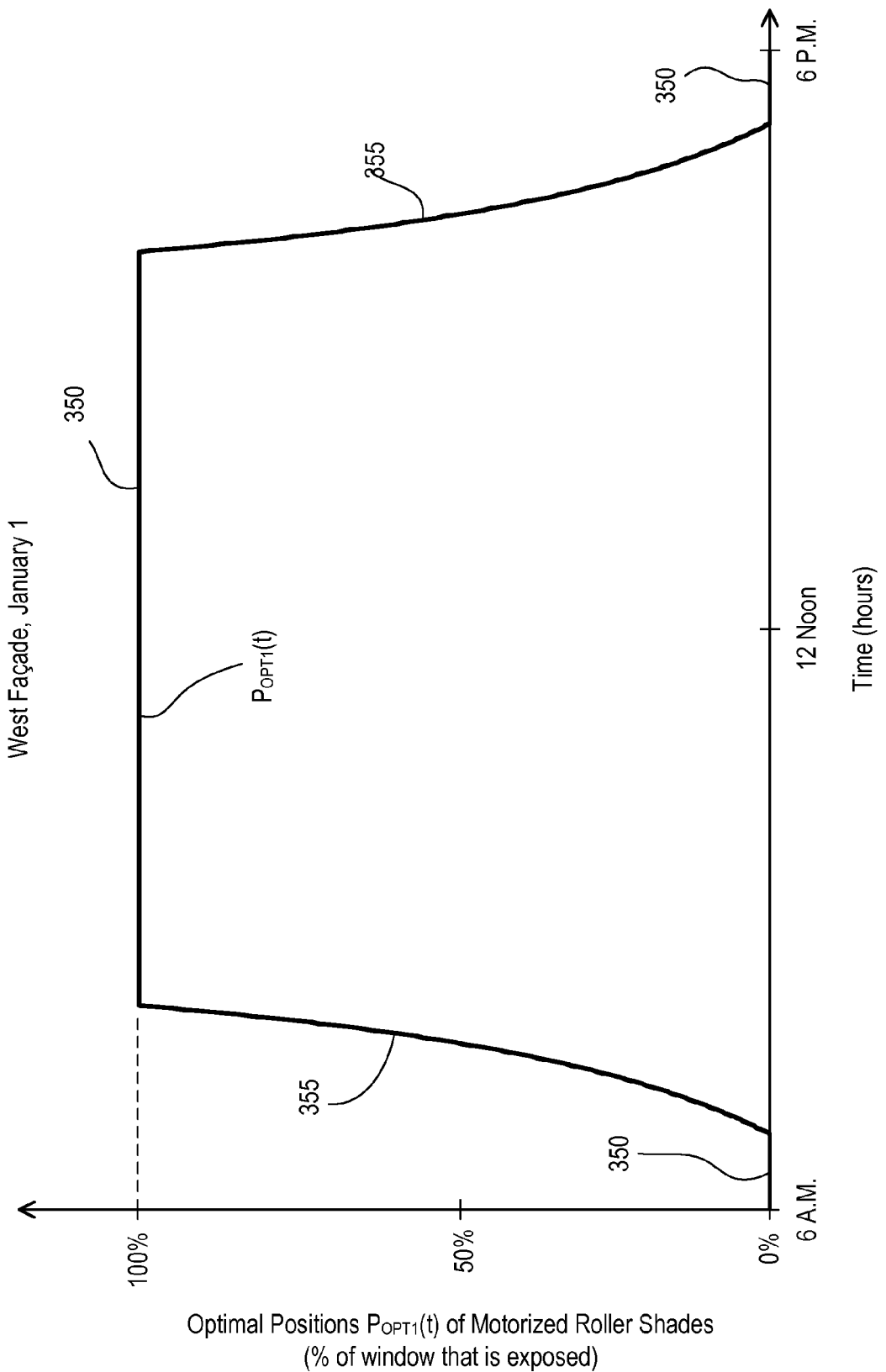

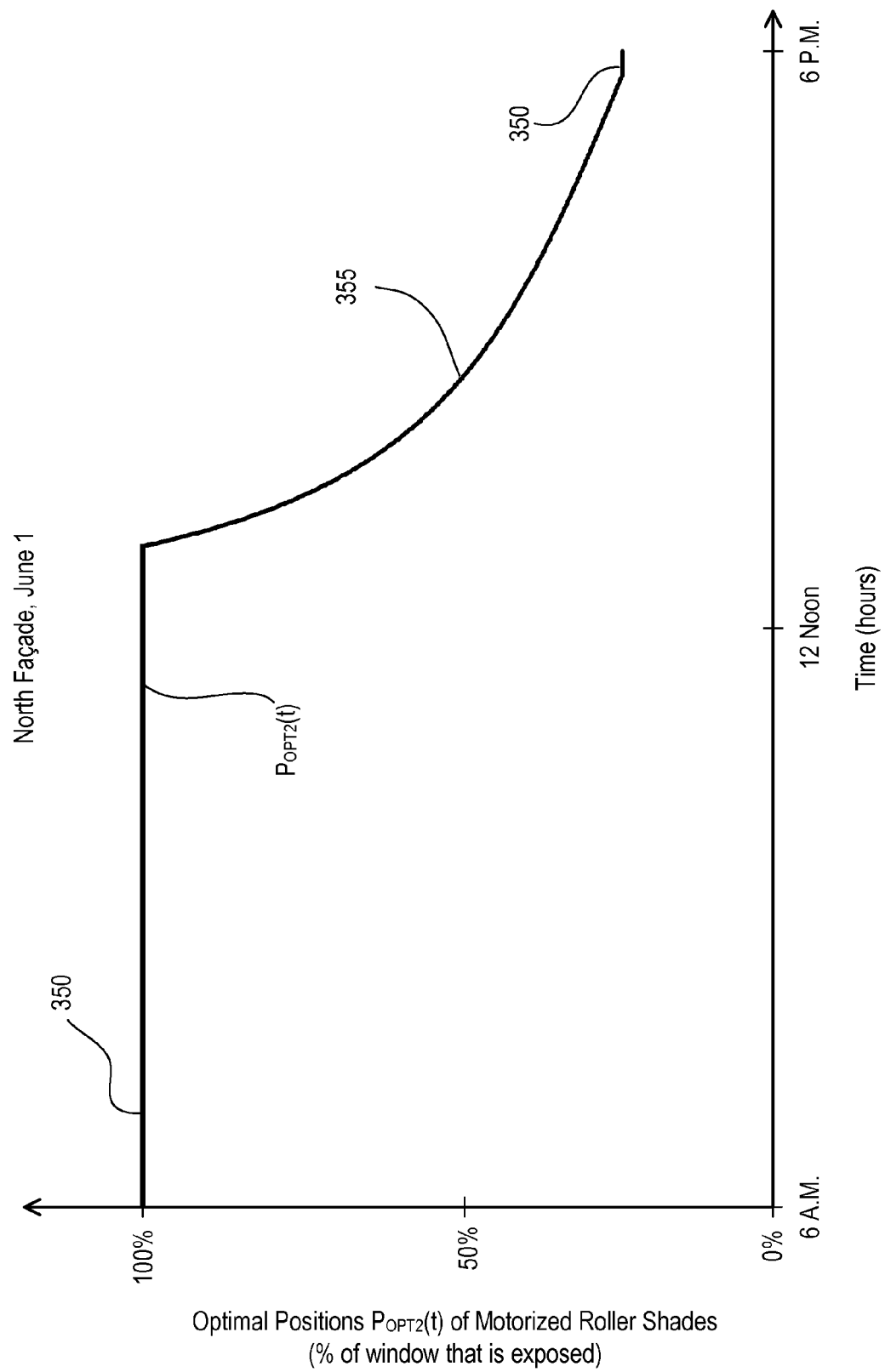

METHOD OF AUTOMATICALLY CONTROLLING MOTORIZED WINDOW TREATMENTS

CROSS-REFERENCE TO RELATED APPLICATIONS

This application is a non-provisional application of commonly-assigned U.S. Provisional Application No. 61/919,874, filed Dec. 23, 2013, entitled METHOD OF AUTOMATICALLY CONTROLLING MOTORIZED WINDOW TREATMENTS, the entire disclosure of which is hereby incorporated by reference.

BACKGROUND

Field of the Disclosure

The present disclosure relates to a load control system for controlling a plurality of electrical loads and a plurality of motorized window treatments in a space, and more particularly, to a procedure for automatically controlling one or more motorized window treatments to prevent direct sun glare on work spaces in the space while minimizing occupant distractions.

Description of the Related Art

Motorized window treatments, such as, for example, motorized roller shades and draperies, provide for control of the amount of sunlight entering a space. Some prior art motorized window treatments have been automatically controlled in response to various inputs, such as daylight sensors and timeclocks. However, the automatic control algorithms of prior art motorized window treatments have resulted in frequent movement of the motorized window treatments, thus causing many distractions to occupants of the space.

Some prior art load control systems have automatically controlled one or more motorized window treatments to prevent sun glare while minimizing occupant distractions. For example, such a load control system may operate to limit the sunlight penetration distance in a space of a building. A system controller (e.g., a central controller) of the load control system may be configured to generate a timeclock schedule for controlling the motorized window treatments for limiting the sunlight penetration distance to a maximum penetration distance. The system controller may comprise an astronomical timeclock and may be configured to control the motorized window treatments according to the timeclock schedule to limit the sunlight penetration distance in the space.

Prior to execution of the timeclock schedule (e.g., at or before the beginning of each day), the system controller may be configured to analyze the position of the sun throughout the coming day on each façade of the building to determine the positions to which the motorized window treatments along a single façade must be controlled in order to prevent the sunlight penetration distance from exceeding the maximum penetration distance. The system controller may be configured to build the timeclock schedule to have a number of events throughout the day, such that the number of movements during each day does not exceed a maximum number of movements to minimize occupant distractions. The system controller may be configured to determine the positions to which to control the motorized window treatments on each façade at the event times of the timeclock procedure using the determined positions to which to control the motorized window treatments to prevent the sunlight penetration distance from exceeding the maximum penetration distance. Examples of load control systems for controlling motorized window treatments to limit the sunlight penetration distance in a space while minimizing occupant distractions are described in greater detail in commonly-assigned U.S. Pat. No. 8,288,981, issued Oct. 16, 2012, entitled METHOD OF AUTOMATICALLY CONTROLLING A MOTORIZED WINDOW TREATMENT WHILE MINIMIZING OCCUPANT DISTRACTIONS, the entire disclosure of which is hereby incorporated by reference.

Since the penetration distance in a space is dependent upon the position of the sun as well as an angle of the façade with respect to true north, all of the motorized window treatments along a single façade will typically be controlled to the same position by the system controller when executing the timeclock schedule. However, the motorized window treatments on adjacent facades that have different façade angles may be controlled to different positions. If the perimeter of a building is characterized by a number of façade angles, the motorized window treatments along the perimeter of the building may each be controlled to different positions, which may detract from the aesthetic appearance of the motorized window treatments in the building. In addition, some building have continuously curved facades, where the motorized window treatments located along the façade are each arranged at different angles. Accordingly, there is a need for a method of automatically controlling one or more motorized window treatments along a non-linear façade to prevent sun glare, while minimizing occupant distractions and maintaining alignment of adjacent motorized window treatments along the façade.

SUMMARY

As described herein, a load control system may automatically control the amount of daylight entering a space of a building through at least one window of a non-linear façade of the building, where the non-linear façade is characterized by at least two distinct façade angles. The load control system may comprise at least two motorized window treatments located along the non-linear façade for controlling the amount of daylight entering the space, and a system controller configured to transmit digital commands to the motorized window treatments for controlling the motorized window treatments. The controller may be configured to calculate an optimal position for the motorized window treatments at each of a plurality of different times during a subsequent time interval using the at least two distinct façade angles. The optimal position may be calculated such that a sunlight penetration distance may not exceed a desired maximum sunlight penetration distance at each of the plurality of different times during the time interval. The controller may be configured to use the optimal positions at the plurality of different times during the time interval to determine a controlled position to which both of the motorized window treatments will be controlled during the time interval. The controller may be configured to automatically adjust the position of each of the motorized window treatments to the controlled position at the beginning of the time interval so as to prevent the sunlight penetration distance from exceeding the desired maximum sunlight penetration distance during the time interval.

For example, the system controller may be configured to determine a representative façade angle at each of the plurality of different times during the time interval using the at least two distinct façade angles, and calculate the optimal position for the motorized window treatments at each of the plurality of different times during the time interval using the representative façade angle. The representative façade angle may be equal to a calculated solar azimuth angle of the sun at a specific time if the solar azimuth angle is between the at least two façade angles. In addition, the system controller may be configured to calculate optimal positions for each of first and second motorized window treatments that are arranged at respective first and second façade angles, and to set the controlled positions of the timeclock schedule equal to the lowest of the optimal positions for the first and second motorized window treatments at the plurality of different times during the time interval. Further, the system controller may be configured to calculate an optimal position for each of a plurality of motorized window treatments at a respective façade angle at each of the plurality of different times during the time interval, and to set the controlled position of the timeclock schedule equal to the lowest position of the optimal positions of at the plurality of different times during the time interval.

In addition, a method of automatically controlling at least two motorized window treatments located along a non-linear façade of a building is also described herein. The non-linear façade may be characterized by at least two distinct façade angles. The method may comprise the steps of: (1) calculating an optimal position for the motorized window treatments at each of a plurality of different times during a subsequent time interval using the at least two distinct façade angles, the optimal position calculated such that a sunlight penetration distance will not exceed a desired maximum sunlight penetration distance at each of the plurality of different times during the time interval; (2) using the optimal positions that were calculated at the plurality of different times during the time interval to determine a controlled position to which both of the motorized window treatments will be controlled during the time interval; and (3) automatically adjusting the position of each of the motorized window treatments to the controlled position at the beginning of the time interval so as to prevent the sunlight penetration distance from exceeding the desired maximum sunlight penetration distance during the time interval.

BRIEF DESCRIPTION OF THE DRAWINGS

FIGS. 6A-6C show example plots of optimal shade positions of motorized roller shades on different facades of the building during different days of the year as generated by the optimal shade position procedure of FIG. 5.

DETAILED DESCRIPTION

Figure 1:
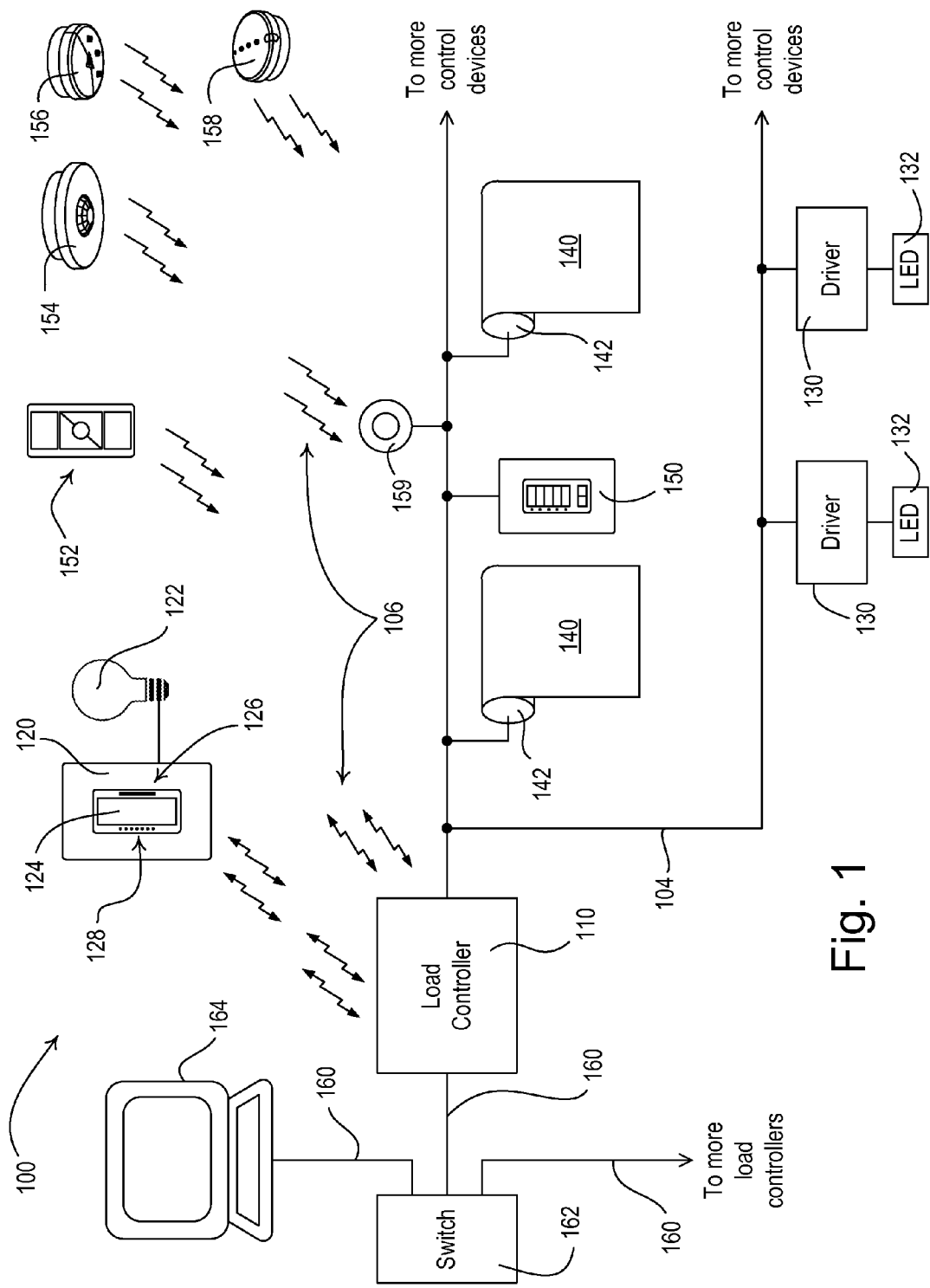
FIG. 1 is a simplified block diagram of an example load control system.

FIG. 1 is a simple diagram of an example load control system for controlling the amount of power delivered from an alternating-current (AC) power source (not shown) to one or more electrical loads. The load control system 100 may comprise a system controller 110 (e.g., a load controller or a central controller) operable to transmit and receive digital messages via wired and/or wireless communication links. For example, the system controller 110 may be coupled to one or more wired control devices via a wired digital communication link 104. In addition, the system controller 110 may be configured to transmit and/or receive wireless signals, e.g., radio-frequency (RF) signals 106, to communicate with one or more wireless control devices. The load control system 100 may comprise a number of control-source devices (e.g., input devices operable to transmit digital messages in response to user inputs, occupancy/vacancy conditions, changes in measured light intensity, etc.) and a number of control-target devices (e.g., load control devices operable to receive digital messages and control respective electrical loads in response to the received digital messages). A single control device of the load control system 100 may operate as both a control-source and a control-target device. The system controller 110 may be configured to receive digital messages from the control-source devices and transmit digital messages to the control-target devices in response to the digital messages received from the control-source devices.

The load control system 100 may comprise a load control device, such as a dimmer switch 120, for controlling a lighting load 122. The dimmer switch 120 may be adapted to be wall-mounted in a standard electrical wallbox. Alternatively, the dimmer switch 120 may comprise a tabletop or plug-in load control device. The dimmer switch 120 may comprise a toggle actuator 124 (e.g., a button) and/or an intensity adjustment actuator 126 (e.g., a rocker switch). Successive actuations of the toggle actuator 124 may toggle, e.g., turn off and on, the lighting load 122. Actuations of an upper portion or a lower portion of the intensity adjustment actuator 126 may respectively increase or decrease the amount of power delivered to the lighting load 122 and thus increase or decrease the intensity of the lighting load from a minimum intensity (e.g., approximately 1%) to a maximum intensity (e.g., approximately 100%). The dimmer switch 120 may further comprise a plurality of visual indicators 128, e.g., light-emitting diodes (LEDs), which may be arranged in a linear array and may be illuminated to provide feedback of the intensity of the lighting load 122. The dimmer switch 120 may be configured to receive digital messages from the system controller 110 via the RF signals 106 and to control the lighting load 122 in response to the received digital messages. The dimmer switch 120 may also be configured to receive digital messages from the system controller 110 via the digital communication link 104, when the dimmer switch is coupled to the digital communication link 104.

The load control system 100 may further comprise one or more remotely-located load control devices, such as light-emitting diode (LED) drivers 130 for driving respective LED light sources 132 (e.g., LED light engines). The LED drivers 130 may be located remotely, for example, in the lighting fixtures of the respective LED light sources 132. The LED drivers 130 may be configured to receive digital messages from the system controller 110 via the digital communication link 104 and to control the respective LED light sources 132 in response to the received digital messages. Alternatively, the LED drivers 130 could be coupled to a separate digital communication link, such as an Ecosystem® or digital addressable lighting interface (DALI) communication link, and the load control system 100 could further comprise a digital lighting controller coupled between the digital communication link 104 and the separate communication link. In addition, the LED drivers 132 could alternatively comprise internal RF communication circuits or be coupled to external RF communication circuits (e.g., mounted external to the lighting fixtures, such as to a ceiling) for transmitting and/or receiving the RF signals 106. The load control system 100 may further comprise other types of remotely-located load control devices, such as, for example, electronic dimming ballasts for driving fluorescent lamps.

The load control system 100 may further comprise a plurality of daylight control devices, e.g., motorized window treatments, such as motorized roller shades 140, to control the amount of daylight entering the building in which the load control system is installed. Each motorized roller shade 140 may comprise a covering material (e.g., a shade fabric) that is wound around a roller tube for raising and lowering the shade fabric. Each motorized roller shade 140 also comprises an electronic drive unit (EDU) 142, which may be located inside the roller tube of the motorized roller shade. The electronic drive units 142 may be coupled to the digital communication link 104 for transmitting and/or receiving digital messages, and may be configured to adjust the position of a window treatment fabric in response to digital messages received from the system controller 110 via the digital communication link 104. Alternatively, each electronic drive unit 142 could comprise an internal RF communication circuit or be coupled to an external RF communication circuit (e.g., located outside of the roller tube) for transmitting and/or receiving the RF signals 106. In addition, the load control system 100 could comprise other types of daylight control devices, such as, for example, a cellular shade, a drapery, a Roman shade, a Venetian blind, a Persian blind, a pleated blind, a tensioned roller shade systems, an electrochromic or smart window, or other suitable daylight control device.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; hydraulic valves for use in radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and an alternative energy controller.

The load control system 100 may comprise one or more input devices, e.g., such as a wired keypad device 150, a battery-powered remote control device 152, an occupancy sensor 154, and a daylight sensor 156. In addition, the load control system 100 may comprise one or more window sensors 158 (e.g., cloudy-day or shadow sensors). The wired keypad device 150 may be configured to transmit digital messages to the system controller 110 via the digital communication link 104 in response to an actuation of one or more buttons of the wired keypad device 150. The battery-powered remote control device 152, the occupancy sensor 154, the daylight sensor 156, and/or the window sensor 158 may be wireless control devices (e.g., RF transmitters) configured to transmit digital messages to the system controller 110 via the RF signals 106 (e.g., directly to the system controller). For example, the battery-powered remote control device 152 may be configured to transmit digital messages to the system controller 110 via the RF signals 106 in response to an actuation of one or more buttons of the battery-powered remote control device. The system controller 110 may be configured to transmit one or more digital messages to the load control devices (e.g., the dimmer switch 120, the LED drivers 130, and/or the motorized roller shades 140) in response to the digital messages received from the wired keypad device 150, the battery-powered remote control device 152, the occupancy sensor 154, the daylight sensor 156, and/or the window sensor 158.

The load control system 100 may further comprise a wireless adapter device 159 coupled to the digital communication link 104 and configured to receive the RF signals 106. The wireless adapter device 159 may be configured to transmit a digital message to the system controller 110 via the digital communication link 104 in response to a digital message received from one of the wireless control devices via the RF signals 106. For example, the wireless adapter device 159 may simply re-transmit the digital messages received from the wireless control devices on the digital communication link 104.

The occupancy sensor 154 may be configured to detect occupancy and/or vacancy conditions in the space in which the load control system 100 is installed. The occupancy sensor 154 may transmit digital messages to the system controller 110 via the RF signals 106 in response to detecting the occupancy or vacancy conditions. The system controller 110 may each be configured to turn one or more of the lighting load 122 and the LED light sources 132 on and off in response to receiving an occupied command and a vacant command, respectively. Alternatively, the occupancy sensor 154 may operate as a vacancy sensor, such that the lighting loads are turned off in response to detecting a vacancy condition, but not turned on in response to detecting an occupancy condition. Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 156 may be configured to measure a total light intensity in the space in which the load control system is installed. The daylight sensor 156 may transmit digital messages including the measured light intensity to the system controller 110 via the RF signals 106 for controlling the intensities of one or more of the lighting load 122 and the LED light sources 132 in response to the measured light intensity. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

In addition, the load control system 100 may comprise other types of input devices, such as, for example, temperature sensors; humidity sensors; radiometers; pressure sensors; smoke detectors; carbon monoxide detectors; air-quality sensors; motion sensors; security sensors; proximity sensors; fixture sensors; partition sensors; keypads; kinetic or solar-powered remote controls; key fobs; cell phones; smart phones; tablets; personal digital assistants; personal computers; laptops; timeclocks; audio-visual controls; safety devices; power monitoring devices (such as power meters, energy meters, utility submeters, utility rate meters, etc.); central control transmitters; residential, commercial, or industrial controllers; or any combination of these input devices.

The system controller 110 may be configured to control the load control devices (e.g., the dimmer switch 120, the LED drivers 130, and/or the motorized roller shades 140) according to a timeclock schedule, which may be stored in a memory in the system controller. The timeclock schedule may include a number of timeclock events, each having an event time and a corresponding command or preset. The system controller 110 may be configured to keep track of the present time and day and to transmit the appropriate command or preset at the respective event time of each timeclock event.

The system controller 110 may be coupled to a network, such as a wireless or wired local area network (LAN) via a network communication bus 160 (e.g., an Ethernet communication link), e.g., for access to the Internet. The system controller 110 may be connected to a router 162 (or Ethernet switch) via the network communication bus 160 for allowing the system controller 110 to communicate with additional system controllers for controlling additional electrical loads. Alternatively, the system controller 110 may be wirelessly connected to the network, e.g., using Wi-Fi technology. The system controller 110 may also be configured to communicate via the network with one or more network devices, such as, a smart phone (for example, an iPhone® smart phone, an Android® smart phone, or a Blackberry® smart phone), a personal computer 164, a laptop, a tablet device (for example, an iPad® hand-held computing device), a Wi-Fi or wireless-communication-capable television, or any other suitable Internet-Protocol-enabled device. The network device may be operable to transmit digital messages to the system controller 110 in one or more Internet Protocol packets. Examples of load control systems operable to communicate with network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The operation of the load control system 100 may be programmed and configured using the network device (e.g., the personal computer 164). The network device may execute a graphical user interface (GUI) configuration software for allowing a user to program how the load control system 100 will operate. The configuration software may generate a load control database that defines the operation and/or performance of the load control system 100. For example, the load control database may include information regarding the different load control devices of the load control system (e.g., the dimmer switch 120, the LED drivers 130, and/or the motorized roller shades 140). The load control database may also include information regarding associations between the load control devices and the input devices (e.g., the wired keypad device 150, the battery-powered remote control device 152, the occupancy sensor 154, the daylight sensor 156, and/or the window sensor 158), and how the load control devices respond to inputs received from the input devices. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2014/0265568, published Sep. 18, 2014, entitled COMMISSIONING LOAD CONTROL SYSTEMS, the entire disclosures of which are hereby incorporated by reference.

The system controller 110 may be configured to automatically control the motorized window treatments (e.g., the motorized roller shades 140) to save energy and/or improve the comfort of the occupants of the building in which the load control system 100 is installed. For example, the system controller 110 may be configured to automatically control the motorized roller shades 140 in response to the timeclock schedule and/or the daylight sensor 156 or the window sensor 158.

The load control system 100 may operate in a sunlight penetration limiting mode to control the amount of sunlight entering a space 170 (FIG. 2) of a building to control a sunlight penetration distance $d_{PEN}$ in the space 170. Specifically, the system controller 110 may be operable to transmit digital messages to the motorized roller shades 140 to limit the sunlight penetration distance $d_{PEN}$ in the space 170 to a desired maximum sunlight penetration distance $d_{MAX}$. The system controller 100 may comprise an astronomical timeclock, such that the system controller is able to determine the sunrise time $t_{SUNRISE}$ and the sunset time $t_{SUNSET}$ for each day of the year for a specific location. The system controller 110 may transmit commands to the electronic drive units 142 to automatically control the motorized roller shades 140 in response to a timeclock schedule. Alternatively, the network device (e.g., the personal computer 164) could comprise the astronomical timeclock and could transmit the digital messages to the motorized roller shades 140 to control the sunlight penetration distance $d_{PEN}$ in the space 170.

The one or more window sensors 158 may be mounted to the inside surfaces of one or more windows 176 (FIG. 2) in the space 170 or to the exterior of the building. Each window sensor 158 may be battery-powered and may be operable to transmit the RF signals 106 to the wireless adapter device 159. The wireless adapter device 159 may be operable to transmit digital messages to the system controller 110 via the digital communication link 104 in response to the RF signals 106 from the window sensors 158. The window sensors 158 are each configured to measure the light intensity at the sensor, and to transmit a digital message including the measured light intensity, for example, when the magnitude of the light intensity changes by a predetermined amount (e.g., approximately 20%). In response to the digital messages received from the window sensors 158, via the wireless adapter device 159 for example, the system controller 110 may be configured to enable and/or disable the sunlight penetration limiting mode as will be described in greater detail below. The window sensors 158 may be located at different windows around the building (as well as a plurality of sensor receiver modules), such that the load control system 100 may enable the sunlight penetration limiting mode in some areas of the building and not in others. Examples of window sensors are described in greater detail in commonly assigned U.S. Patent Application Publication No. 2014/0156079, published Jun. 5, 2014, entitled METHOD OF CONTROLLING A MOTORIZED WINDOW TREATMENT, the entire disclosure of which is hereby incorporated by reference.

In addition, the load controls system 100 could comprise pairs of window sensors. The pairs of window sensors may be located on opposite sides of a mullion of a window of the building or at opposite sides of a window. Each one of the two sensors of the paired window sensors may look similar to the daylight sensor 156 shown in FIG. 1, and may have a lens that is directed outside the window. The system controller 110 may be responsive to the measured light intensities of both of the sensors of each pair of sensors as if the pair of sensors was a single window sensor 158. For example, the system controller 110 may add the measured light intensities of both of the sensors of each pair of sensors and may enable and disable the sunlight penetration limiting mode in response to the sum of the measured light intensities of both of the sensors of each pair of sensors.

Figure 2:
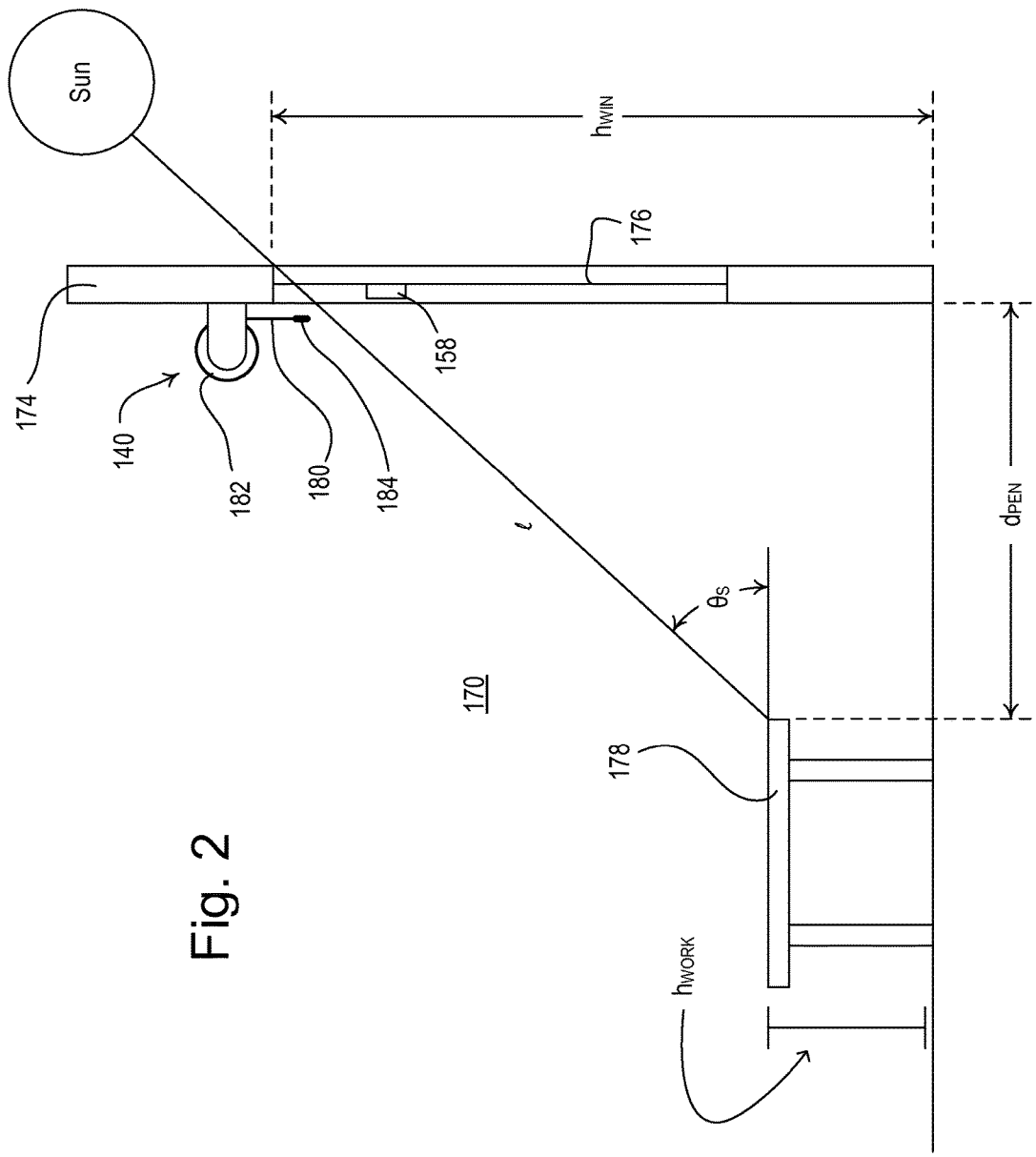
FIG. 2 is a simplified side view of an example of a space of a building having a window covered by a motorized roller shade of a load control system.

FIG. 2 is a simplified side view of an example of the space 170 illustrating the sunlight penetration distance $d_{PEN}$, which is controlled by the motorized roller shades 140. As shown in FIG. 2, the building comprises a façade 174 (e.g., one side of a four-sided rectangular building) having a window 176 for allowing sunlight to enter the space. The space 170 also comprises a work surface, e.g., a table 178, which has a height $h_{WORK}$. The window sensor 158 may be mounted to the inside surface of the window 176 as shown in FIG. 2. The motorized roller shade 140 is mounted above the window 176 and comprises a roller tube 182 around which a shade fabric 180 is wrapped. The shade fabric 180 may have a hembar 184 at the lower edge of the shade fabric. The electronic drive unit 142 may rotate the roller tube 182 to move the shade fabric 180 between a fully-open position $P_{FO}$ (e.g., in which the window 176 is not covered) and a fully-closed position $P_{FC}$ (e.g., in which the window 176 is fully covered). Further, the electronic drive unit 142 may control the position of the shade fabric 180 to one of a plurality of preset positions between the fully-open position $P_{FO}$ and the fully-closed position $P_{FC}$.

The sunlight penetration distance $d_{PEN}$ is the distance from the window 176 and/or the façade 174 at which direct sunlight shines into the room. The sunlight penetration distance $d_{PEN}$ is a function of a height $h_{WIN}$ of the window 176 and an angle $\phi_F$ of the façade 174 with respect to true north (e.g., a façade angle of zero degrees), as well as a solar elevation angle $\theta_S$ and a solar azimuth angle $\phi_S$, which define the position of the sun in the sky. The solar elevation angle $\theta_S$ and the solar azimuth angle $\phi_S$ are functions of the present date and time, as well as the position (e.g., the longitude and latitude) of the building in which the space 170 is located. The solar elevation angle $\theta_S$ may be the angle between a line directed towards the sun and a line directed towards the horizon at the position of the building. The solar elevation angle $\theta_S$ can also be thought of as the angle of incidence of the sun's rays on a horizontal surface. The solar azimuth angle $\phi_S$ is the angle formed by the line from the observer to true north and the line from the observer to the sun projected on the ground. When the solar elevation angle $\theta_S$ is small (e.g., around sunrise and sunset), small changes in the position of the sun may result in relatively large changes in the magnitude of the sunlight penetration distance $d_{PEN}$.

Figure 3A:
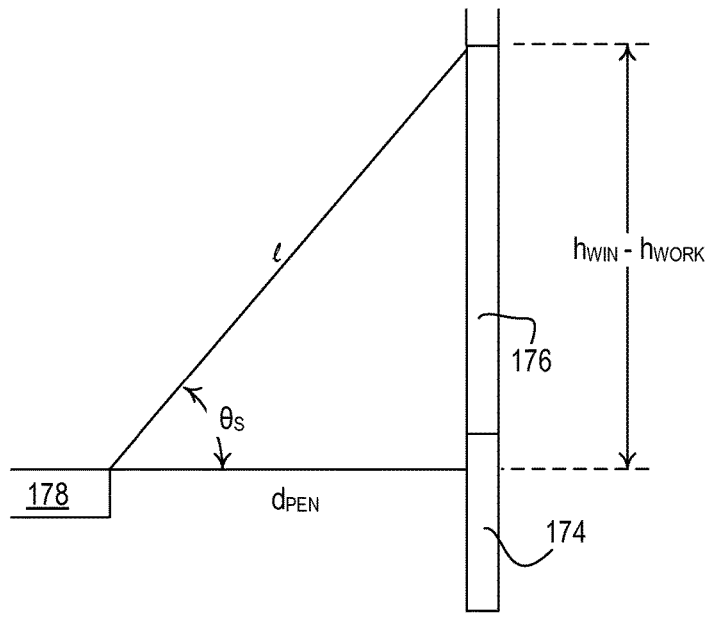
FIG. 3A is a side view of the window of FIG. 2 illustrating a sunlight penetration depth.

The sunlight penetration distance $d_{PEN}$ of direct sunlight onto the table 178 of the space 170 (which may be measured normal to the surface of the window 176) can be determined by considering a triangle formed by the length l of the deepest penetrating ray of light (which is parallel to the path of the ray), the difference between the height $h_{WIN}$ of the window 176 and the height $h_{WORK}$ of the table 178, and the distance between the table and the wall of the façade 174 e.g., the sunlight penetration distance $d_{PEN}$) as shown in the side view of the window 176 in FIG. 3A, e.g., $$\tan(\theta_S) = (h_{WIN} - h_{WORK})/l, \qquad \text{(Equation 1)}$$

where $\theta_S$ is the solar elevation angle of the sun at a given date and time for a given location (e.g., longitude and latitude) of the building.

Figure 3B:
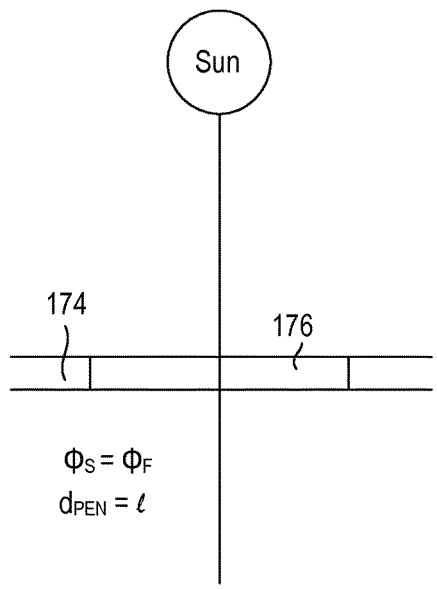
FIG. 3B is a top view of the window of FIG. 2 when the sun is directly incident upon the window.
Figure 3C:
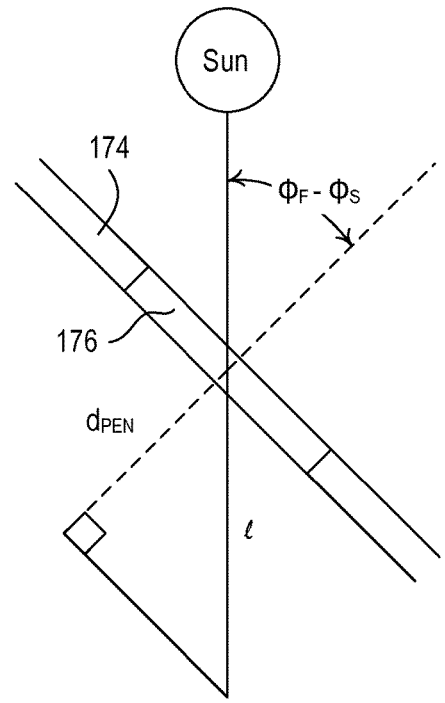
FIG. 3C is a top view of the window of FIG. 2 when the sun is not directly incident upon the window.

If the sun is directly incident upon the window 176, a solar azimuth angle $\phi_S$ and the façade angle $\phi_F$ (e.g., with respect to true north) are equal as shown by the top view of the window 176 in FIG. 3B. Accordingly, the sunlight penetration distance $d_{PEN}$ may equal the length l of the deepest penetrating ray of light. However, if the façade angle $\phi_F$ is not equal to the solar azimuth angle $\phi_S$, the sunlight penetration distance $d_{PEN}$ is a function of the cosine of the difference between the façade angle $\phi_F$ and the solar azimuth angle $\phi_S$, e.g., $$d_{PEN}=l\cdot\cos(|\phi_F-\phi_S|), \quad \text{(Equation 2)}$$

as shown by the top view of the window 176 in FIG. 3C.

As previously mentioned, the solar elevation angle $\theta_S$ and the solar azimuth angle $\phi_S$ define the position of the sun in the sky and are functions of the position (e.g., the longitude and latitude) of the building in which the space 170 is located and the present date and time. The following equations may be used to approximate the solar elevation angle $\theta_S$ and the solar azimuth angle $\phi_S$. The equation of time defines essentially the difference in a time as given by a sundial and a time as given by a clock. This difference is due to the obliquity of the Earth's axis of rotation. The equation of time can be approximated by $$E=9.87\cdot\sin(2B)-7.53\cdot\cos(B)-1.5\cdot\sin(B), \quad \text{(Equation 3)}$$

where $B=[360°\cdot(N_{DAY}-81)]/364$, and $N_{DAY}$ is the present day-number for the year (e.g., $N_{DAY}$ equals one for January 1, $N_{DAY}$ equals two for January 2, and so on).

The solar declination $\delta$ is the angle of incidence of the rays of the sun on the equatorial plane of the Earth. If the eccentricity of Earth's orbit around the sun is ignored and the orbit is assumed to be circular, the solar declination is given by:

$$\delta=23.45°\cdot\sin[360°/365\cdot(N_{DAY}+284)]. \quad \text{(Equation 4)}$$

The solar hour angle H is the angle between the meridian plane and the plane formed by the Earth's axis and current location of the sun, e.g., $$H(t)=\{\tfrac{1}{4}[t+E-(4\cdot\lambda)+(60\cdot t_{TZ})]\}-180°, \quad \text{(Equation 5)}$$

where t is the present local time of the day, $\lambda$ is the local longitude, and $t_{TZ}$ is the time zone difference (e.g., in unit of hours) between the local time t and Greenwich Mean Time (GMT). For example, the time zone difference $t_{TZ}$ for the Eastern Standard Time (EST) zone is −5. The time zone difference $t_{TZ}$ can be determined from the local longitude $\lambda$ and latitude $\phi$ of the building. For a given solar hour angle H, the local time can be determined by solving Equation 5 for the time t, e.g., $$t=720+4\cdot(H+\lambda)-(60\cdot t_{TZ})-E. \quad \text{(Equation 6)}$$

When the solar hour angle H equals zero, the sun is at the highest point in the sky, which is referred to as "solar noon" time $t_{SN}$, e.g., $$t_{SN}=720+(4\cdot\lambda)-(60\cdot t_{TZ})-E. \quad \text{(Equation 7)}$$

A negative solar hour angle H indicates that the sun is east of the meridian plane (e.g., morning), while a positive solar hour angle H indicates that the sun is west of the meridian plane (e.g., afternoon or evening).

The solar elevation angle $\theta_S$ as a function of the present local time t can be calculated using the equation:

$$\theta_S(t)=\sin^{-1}[\cos(H(t))\cdot\cos(\delta)\cdot\cos(\phi)+\sin(\delta)\cdot\sin(\phi)], \quad \text{(Equation 8)}$$

wherein $\phi$ is the local latitude. The solar azimuth angle $\phi_S$ as a function of the present local time t can be calculated using the equation:

$$\phi_S(t)=180°\cdot C(t)\cdot\cos^{-1}[X(t)/\cos(\theta_S(t))], \quad \text{(Equation 9)}$$

where $$X(t)=[\cos(H(t))\cdot\cos(\delta)\cdot\sin(\phi)-\sin(\delta)\cdot\cos(\phi)], \quad \text{(Equation 10)}$$

and C(t) equals negative one if the present local time t is less than or equal to the solar noon time $t_{SN}$ or one if the present local time t is greater than the solar noon time $t_{SN}$. The solar azimuth angle $\phi_S$ can also be expressed in terms independent of the solar elevation angle $\theta_S$, e.g., $$\phi_S(t)=\tan^{-1}[-\sin(H(t))\cdot\cos(\delta)/Y(t)], \quad \text{(Equation 11)}$$

where $$Y(t)=[\sin(\delta)\cdot\cos(\phi)-\cos(\delta)\cdot\sin(\phi)\cdot\cos(H(t))]. \quad \text{(Equation 12)}$$

Thus, the solar elevation angle $\theta_S$ and the solar azimuth angle $\phi_S$ are functions of the local longitude $\lambda$ and latitude $\phi$ and the present local time t and date (e.g., the present day-number $N_{DAY}$). Using Equations 1 and 2, the sunlight penetration distance can be expressed in terms of the height $h_{WIN}$ of the window 176, the height $h_{WORK}$ of the table 178, the solar elevation angle $\theta_S$, and the solar azimuth angle $\phi_S$.

As previously mentioned, the system controller 110 may operate in the sunlight penetration limiting mode to control the motorized roller shades 140 to limit the sunlight penetration distance $d_{PEN}$ to be less than the desired maximum sunlight penetration distance $d_{MAX}$. For example, the sunlight penetration distance $d_{PEN}$ may be limited such that the sunlight does not shine directly on the table 178 to prevent sun glare on the table. The desired maximum sunlight penetration distance $d_{MAX}$ may be entered using the GUI software of the network device (e.g., the personal computer 164) and may be stored in memory in the system controller 110. In addition, the user may also use the GUI software of the network device to enter the present date and time, the present time zone, the local longitude $\lambda$ and latitude $\phi$ of the building, the façade angle $\phi_F$ for each façade 174 of the building, the height $h_{WIN}$ of the windows 176 in spaces 170 of the building, and the heights $h_{WORK}$ of the workspaces (e.g., tables 178) in the spaces of the building. These operational characteristics (or a subset of these operational characteristics) may also be stored in the memory of the system controller 110. Further, the motorized roller shades 140 may be controlled such that distractions to an occupant of the space 170 (e.g., due to movements of the motorized roller shades 140) are minimized.

The system controllers 110 of the load control system 110 may be operable to generate a timeclock schedule defining the desired operation of the motorized roller shades 140 for each of the façades 174 of the building to limit the sunlight penetration distance $d_{PEN}$ in the space 170. For example, the system controller 110 may generate once each day at midnight a subsequent timeclock schedule for limiting the sunlight penetration distance $d_{PEN}$ in the space 170 for the next day. The system controller 110 may be operable to calculate optimal shade positions of the motorized roller shades 140 in response to the desired maximum sunlight penetration distance $d_{MAX}$ at a plurality of times for the next day. The system controllers 110 are then operable to use the calculated optimal shade positions as well as a user-selected minimum time period $T_{MIN}$ between shade movements and/or a minimum number $N_{MIN}$ of shade movements per day to generate the timeclock schedule for the next day.

The minimum time period $T_{MIN}$ that may exist between any two consecutive movements of the motorized roller shades and/or the minimum number $N_{MIN}$ of shade movements per day may be entered using the GUI software of the network device and may be stored in the memory in the system controllers 110. The user may select different values for desired maximum sunlight penetration distance $d_{MAX}$, the minimum time period $T_{MIN}$ that may exist between any two consecutive movements of the motorized roller shades, and/or the minimum number $N_{MIN}$ of shade movements per day for different areas and/or different groups of motorized roller shades 140 in the building. In other words, a different timeclock schedule may be executed for the different areas and/or different groups of motorized roller shades 140 in the building (e.g., the different façades 174 of the building).

Figure 4:
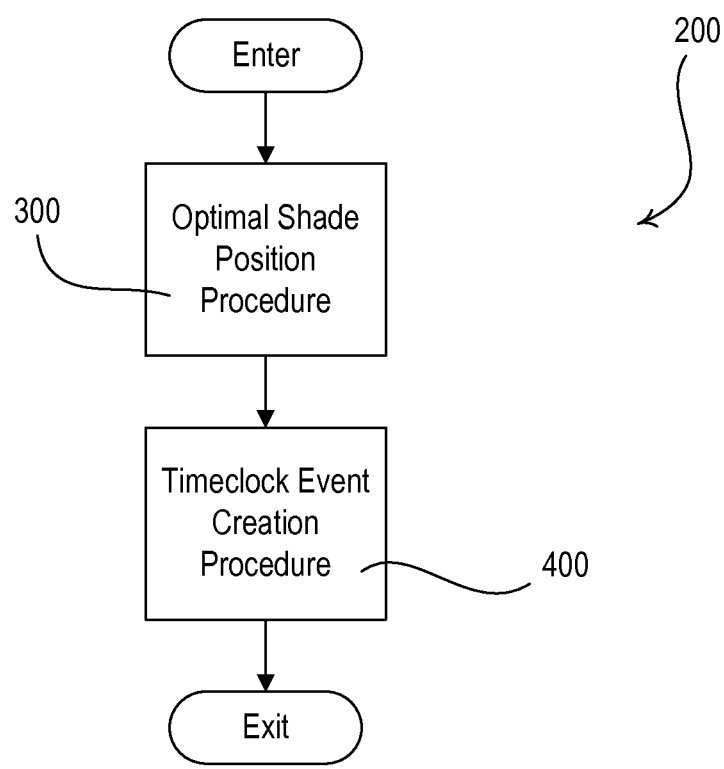
FIG. 4 is a simplified flowchart of an example timeclock configuration procedure executed periodically by a system controller of a load control system.

FIG. 4 is a simplified flowchart of an example timeclock configuration procedure 200 that may be executed periodically by a system controller of a load control system (e.g., the system controller 110 of the load control system 100) to generate a timeclock schedule defining the desired operation of motorized window treatments (e.g., the motorized roller shades 140) of each façade (e.g., each linear façade) of a building. For example, the timeclock configuration procedure 200 may be executed once each day at midnight to generate a timeclock schedule for one or more areas in the building. The timeclock schedule may be executed between a start time $t_{START}$ and an end time $t_{END}$ of the present day. During the timeclock configuration procedure 200, the system controller may perform an optimal shade position procedure 300 (shown in FIG. 5) for determining optimal shade positions $P_{OPT}(t)$ of the motorized roller shades in response to the desired maximum sunlight penetration distance $d_{MAX}$ for each interval (e.g., minute) between the start time $t_{START}$ and the end time $t_{END}$ of the present day. The system controller may then execute a timeclock event creation procedure 400 (shown in FIG. 7) to generate the events of the timeclock schedule in response to the optimal shade positions $P_{OPT}(t)$ and the user-selected minimum time period $T_{MIN}$ between shade movements.

The timeclock schedule may be split up into a number of consecutive time intervals, each having a length equal to the minimum time period $T_{MIN}$ between shade movements. The system controller may consider each time interval and determine a position to which the motorized roller shades should be controlled in order to prevent the sunlight penetration distance $d_{PEN}$ from exceeding the desired maximum sunlight penetration distance $d_{MAX}$ during the respective time interval. The system controller may create events in the timeclock schedule, each having an event time equal to the beginning of a respective time interval and a corresponding position equal to the determined position to which the motorized roller shades should be controlled in order to prevent the sunlight penetration distance $d_{PEN}$ from exceeding the desired maximum sunlight penetration distance $d_{MAX}$. However, the system controller may not create a timeclock event when the determined position of a specific time interval is equal to the determined position of a preceding time interval (as will be described in greater detail below). Therefore, the event times of the timeclock schedule may be spaced apart by multiples of the user-specified minimum time period $T_{MIN}$ between shade movements.

Figure 5:
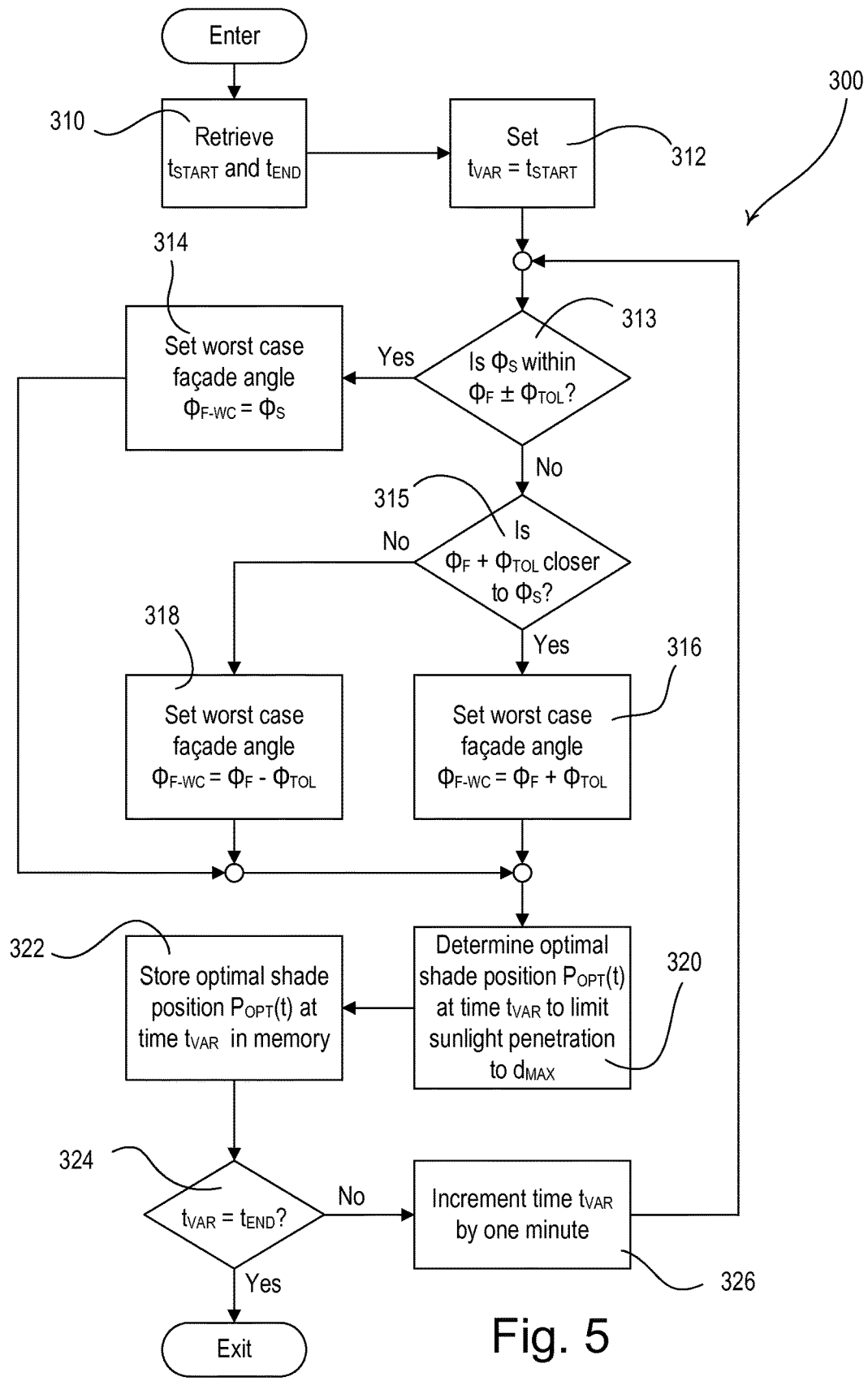
FIG. 5 is a simplified flowchart of an example optimal shade position procedure executed during the timeclock configuration procedure of FIG. 4.

FIG. 5 is a simplified flowchart of the optimal shade position procedure 300, which may be executed by the system controller to generate the optimal shade positions $P_{OPT}(t)$ for each interval (e.g., minute) between the start time $t_{START}$ and the end time $t_{END}$ of the timeclock schedule such that the sunlight penetration distance $d_{PEN}$ may not exceed the desired maximum sunlight penetration distance $d_{MAX}$. The system controller may retrieve the start time $t_{START}$ and the end time $t_{END}$ of the timeclock schedule for the present day at step 310. For example, the system controller could use an astronomical timeclock to set the start time $t_{START}$ equal to the sunrise time $t_{SUNRISE}$ for the present day, and the end time $t_{END}$ equal to the sunset time $t_{SUNSET}$ for the present day. Alternatively, the start and end times $t_{START}$, $t_{END}$ could be set to arbitrary times, e.g., 6 A.M. and 6 P.M, respectively.

Next, the system controller may set a variable time $t_{VAR}$ equal to the start time $t_{START}$ at step 312 and determine a worst case façade angle $\phi_{F-WC}$ at the variable time $t_{VAR}$ to use when calculating the optimal shade position $P_{OPT}(t)$ at the variable time $t_{VAR}$. Specifically, if the solar azimuth angle $\phi_S$ is within a façade angle tolerance $\phi_{TOL}$ (e.g., approximately 3°) of the fixed façade angle $\phi_F$ at step 313 (e.g., if $\phi_F - \phi_{TOL} \leq \phi_S \leq \phi_F + \phi_{TOL}$), the system controller may set the worst case façade angle $\phi_{F-WC}$ equal to the solar azimuth angle $\phi_S$ of the façade at step 314. If the solar azimuth angle $\phi_S$ is not within the façade angle tolerance $\phi_{TOL}$ of the façade angle $\phi_F$ at step 313, the system controller may then determine if the façade angle $\phi_F$ plus the façade angle tolerance $\phi_{TOL}$ is closer to the solar azimuth angle $\phi_S$ than the façade angle $\phi_F$ minus the façade angle tolerance $\phi_{TOL}$ at step 315. If so, the system controller may set the worst case façade angle $\phi_{F-WC}$ equal to the façade angle $\phi_F$ plus the façade angle tolerance $\phi_{TOL}$ at step 316. If the façade angle $\phi_F$ plus the façade angle tolerance $\phi_{TOL}$ is not closer to the solar azimuth angle $\phi_S$ than the façade angle $\phi_F$ minus the façade angle tolerance $\phi_{TOL}$ at step 315, the system controller may set the worst case façade angle $\phi_{F-WC}$ equal to the façade angle $\phi_F$ minus the façade angle tolerance $\phi_{TOL}$ at step 318.

At step 320, the system controller may use Equations 1-12 shown above and the worst case façade angle $\phi_{F-WC}$ to calculate the optimal shade position $P_{OPT}(t_{VAR})$ that that may be used in order to limit the sunlight penetration distance $d_{PEN}$ to the desired maximum sunlight penetration distance $d_{MAX}$ at the variable time $t_{VAR}$. At step 322, the system controller may store in the memory the optimal shade position $P_{OPT}(t_{VAR})$ determined in step 320. If the variable time $t_{VAR}$ is not equal to the end time $t_{END}$ at step 324, the system controller may increment the variable time $t_{VAR}$ by one interval (e.g., minute) at step 326 and determine the worst case façade angle $\phi_{F-WC}$ and the optimal shade position $P_{OPT}(t_{VAR})$ for the next variable time $t_{VAR}$ at step 320. When the variable time $t_{VAR}$ is equal to the end time $t_{END}$ at step 324, the optimal shade position procedure 300 may exit.

Figure 6C:
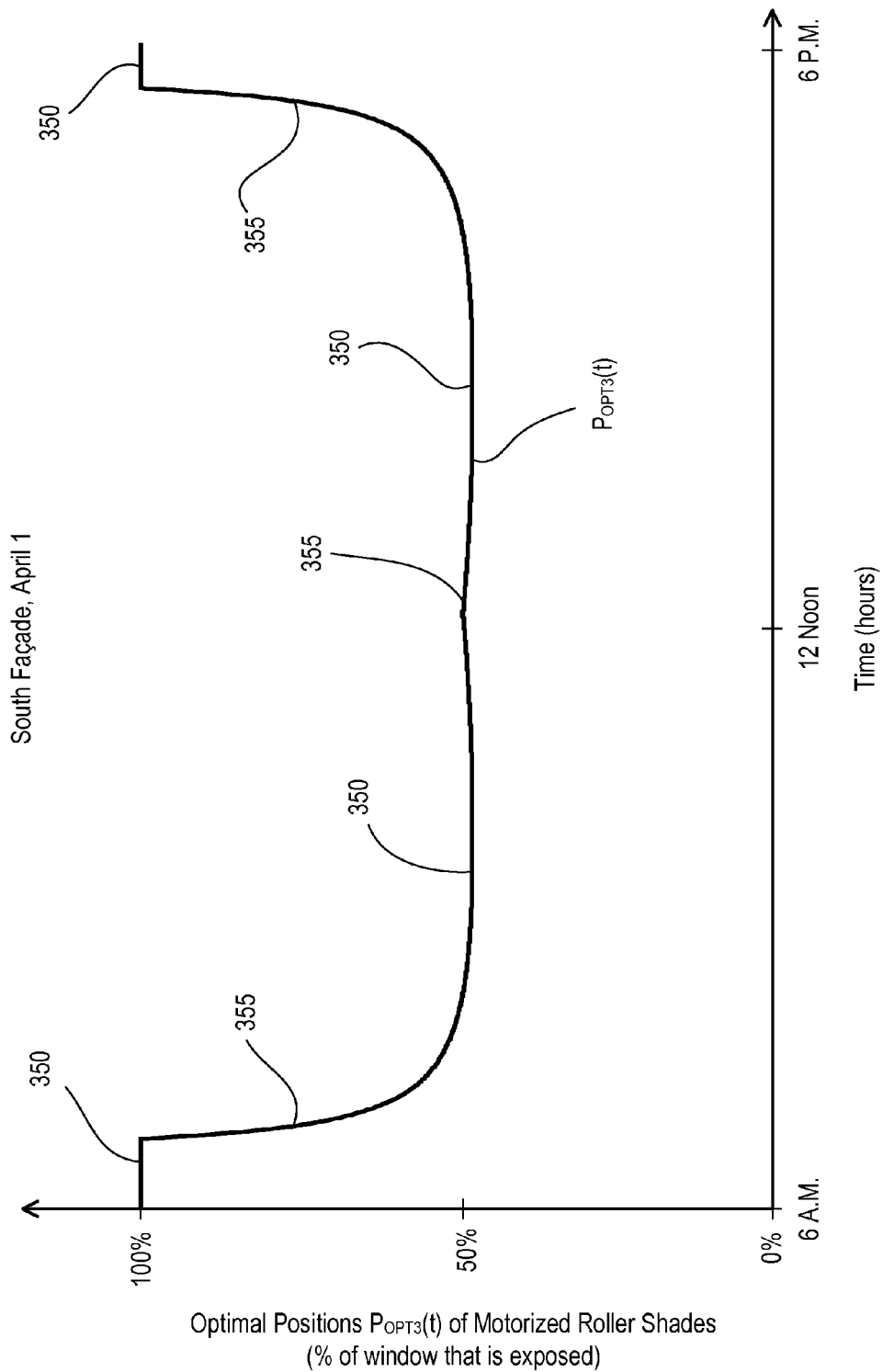

The system controller may generate the optimal shade positions $P_{OPT}(t)$ between the start time $t_{START}$ and the end time $t_{END}$ of the timeclock schedule using the optimal shade position procedure 300. FIG. 6A shows an example plot of optimal shade positions $P_{OPT1}(t)$ of the motorized roller shades on a linear west-facing façade of a building on January 1, where the building is located at a longitude $\lambda$ of approximately 75° W and a latitude $\phi$ of approximately 40° N. FIG. 6B shows an example plot of optimal shade positions $P_{OPT2}(t)$ of the motorized roller shades on a linear north-facing façade of the same building on June 1. FIG. 6C shows an example plot of optimal shade positions $P_{OPT3}(t)$ of the motorized roller shades on a linear south-facing façade of the same building on April 1.

Figure 7:
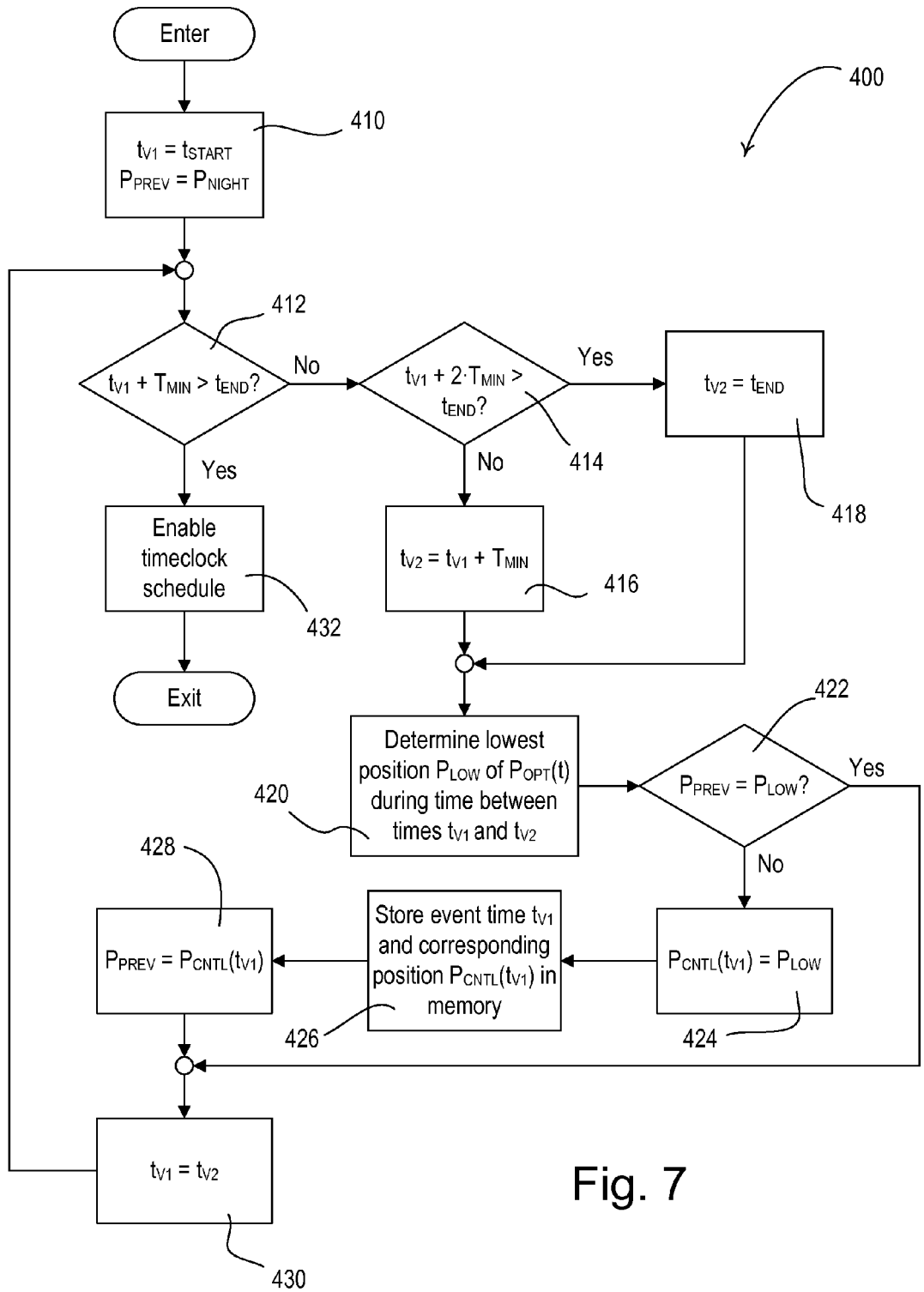
FIG. 7 is a simplified flowchart of an example timeclock event creation procedure executed during the timeclock configuration procedure of FIG. 4.

FIG. 7 is a simplified flowchart of the timeclock event creation procedure 400, which may be executed by the system controller in order to generate the events of the timeclock schedule. Since the timeclock schedule may be split up into a number of consecutive time intervals, the timeclock events of the timeclock schedule may be spaced between the start time $t_{START}$ and the end time $t_{END}$ by multiples of the minimum time period $T_{MIN}$ between shade movements, which may be selected by the user. During the timeclock event creation procedure 400, the system controller may generate controlled shade positions $P_{CNTL}(t)$, which may comprise a number of discrete events, e.g., step changes in the position of the motorized roller shades at the specific event times. The system controller may use the optimal shade positions $P_{OPT}(t)$ from the optimal shade position procedure 300 to correctly determine the controlled shade positions $P_{CNTL}(t)$ of the events of the timeclock schedule. The resulting timeclock schedule may include a number of events, which may each be characterized by an event time and a corresponding preset shade position. The timeclock events may be spaced apart by periods of time that are multiples of the minimum time period $T_{MIN}$. The system controller may use the controlled shade positions $P_{CNTL}(t)$ to adjust the position of the motorized roller shades during execution of the timeclock schedule, e.g., between the start time $t_{START}$ and the end time $t_{END}$. At the end time $t_{END}$, the system controller may control the position of the motorized roller shades to a nighttime position $P_{NIGHT}$ (e.g., the fully-closed position $P_{FC}$).

Figure 8A:
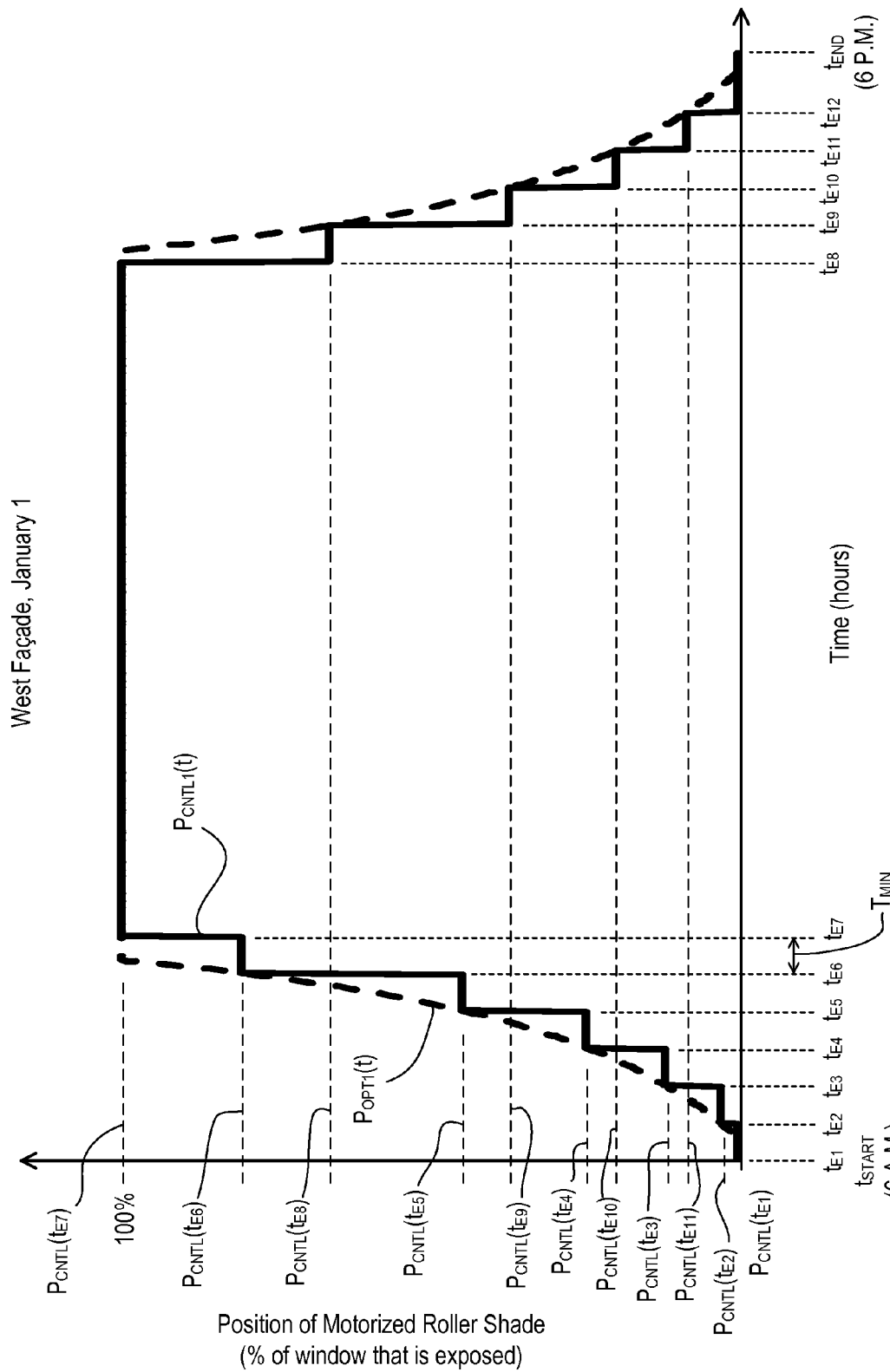
FIGS. 8A-8C show example plots of controlled shade positions of motorized roller shades on different facades of the building during different days of the year as generated by the timeclock event creation procedure of FIG. 7.
Figure 8B:
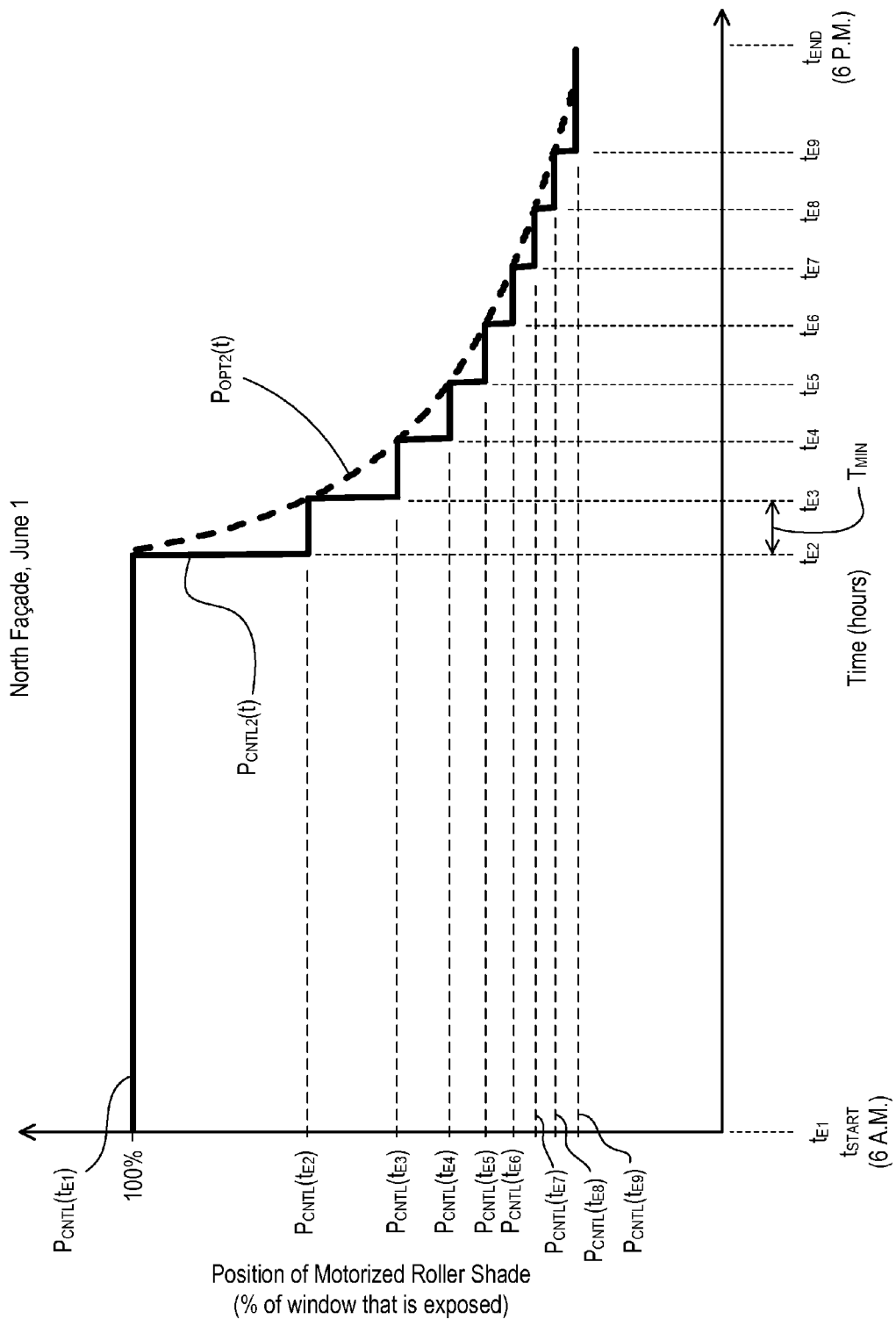
Figure 8C:
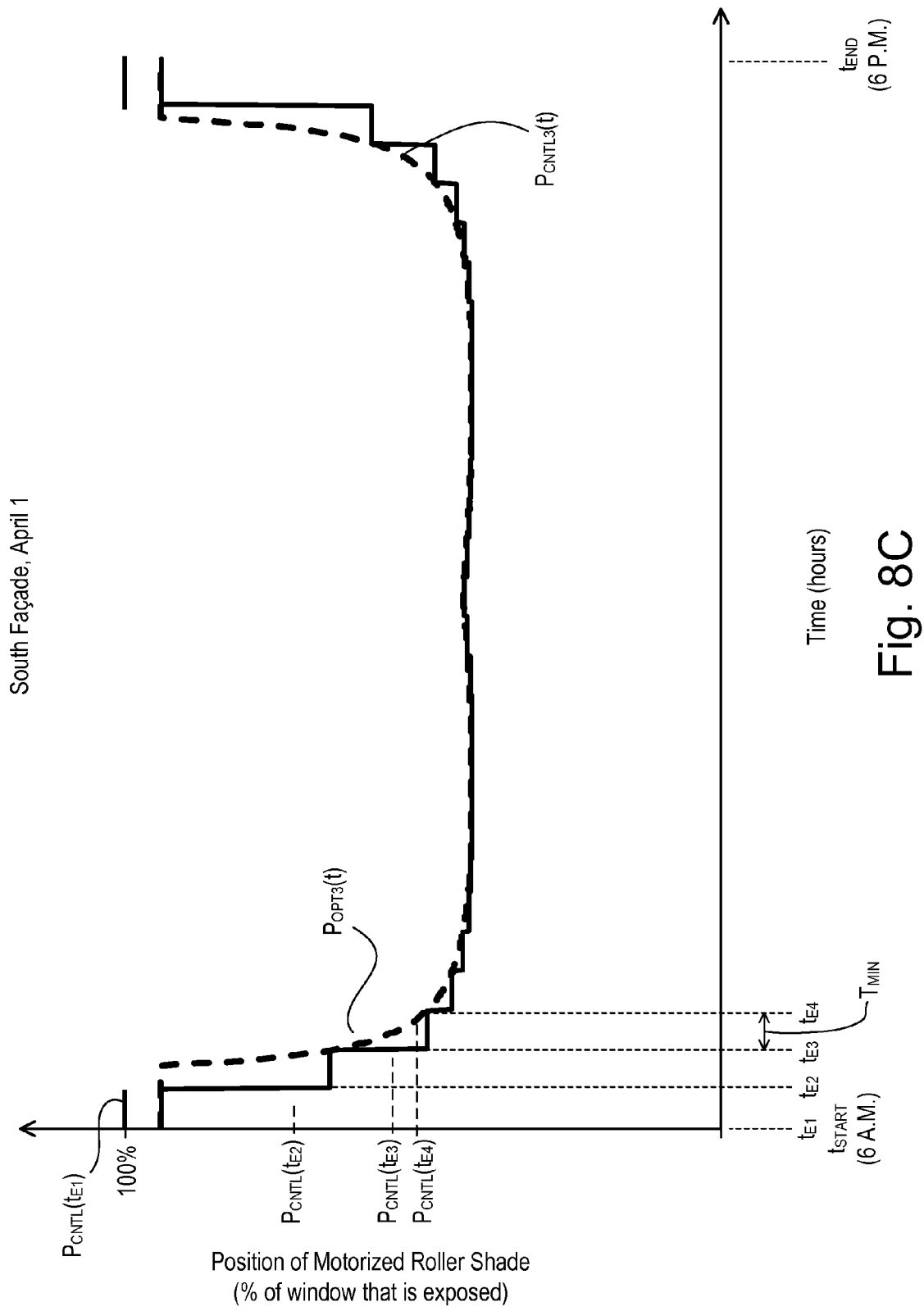

FIG. 8A shows an example plot of controlled shade positions $P_{CNTL1}(t)$ of the motorized roller shades on the linear west-facing façade of the building on January 1 as determined during the timeclock configuration procedure 200 of FIG. 4. FIG. 8B shows an example plot of controlled shade positions $P_{CNTL2}(t)$ of the motorized roller shades on the linear north-facing façade of the building on June 1 as determined during the timeclock configuration procedure 200 of FIG. 4. FIG. 8C shows an example plot of controlled shade positions $P_{CNTL3}(t)$ of the motorized roller shades on the linear south-facing façade of the building on April 1 as determined during the timeclock configuration procedure 200 of FIG. 4.

The system controller may examine the values of the optimal shade positions $P_{OPT}(t)$ during each of the time intervals of the timeclock schedule (e.g., the time periods between two consecutive timeclock events) to determine the lowest shade position $P_{LOW}$ during each of the time intervals. During the timeclock event creation procedure 400, the system controller may use two variable times $t_{V1}$, $t_{V2}$ to define the endpoints of the time interval that the system controller is presently examining. The system controller may use the variable times $t_{V1}$, $t_{V2}$ to sequentially step through the events of the timeclock schedule, which may be spaced apart by the minimum time period $T_{MIN}$. The system controller may set the event times of the timeclock events equal to the beginning of the respective time interval (e.g., the first variable time $t_{V1}$), and the controlled shade positions $P_{CNTL}(t)$ of the timeclock events equal to the lowest shade positions $P_{LOW}$ during the respective time intervals.

Referring to FIG. 7, the system controller may set the first variable time $t_{V1}$ equal to the start time $t_{START}$ of the timeclock schedule at step 410. The system controller may also initialize a previous shade position $P_{PREV}$ to the nighttime position $P_{NIGHT}$ at step 410. If there is enough time left before the end time $t_{END}$ for the present timeclock event (e.g., if the first variable time $t_{V1}$ plus the minimum time period $T_{MIN}$ is not greater than the end time $t_{END}$) at step 412, the system controller may determine at step 414 if there is enough time for another timeclock event in the timeclock schedule after the present timeclock event. If the first variable time $t_{V1}$ plus two times the minimum time period $T_{MIN}$ is not greater than the end time $t_{END}$ at step 414, the system controller may set the second variable time $t_{V2}$ equal to the first variable time $t_{V1}$ plus the minimum time period $T_{MIN}$ at step 416, such that the system controller may then examine the time interval between the first and second variable times $t_{V1}$, $t_{V2}$. If the first variable time $t_{V1}$ plus two times the minimum time period $T_{MIN}$ is greater than the end time $t_{END}$ at step 414, the system controller may set the second variable time $t_{V2}$ equal to the end time $t_{END}$ at step 418, such that the system controller may then examine the time interval between the first variable time $t_{V1}$ and the end time $t_{END}$.

At step 420, the system controller may determine the lowest shade position $P_{LOW}$ of the optimal shade positions $P_{OPT}(t)$ during the present time interval (e.g., between the first variable time $t_{V1}$ and the second variable time $t_{V2}$ determined at steps 416 and 418). If, at step 422, the previous shade position $P_{PREV}$ is not equal to the lowest shade position $P_{LOW}$ during the present time interval (as determined at step 420), the system controller may set the controlled position $P_{CNTL}(t_{V1})$ at the first variable time $t_{V1}$ to be equal to the lowest shade position $P_{LOW}$ of the optimal shade positions $P_{OPT}(t)$ during the present time interval at step 424. The system controller may then store in memory a timeclock event having the event time $t_{V1}$ and the corresponding controlled position $P_{CNTL}(t_{V1})$ at step 426 and set the previous shade position $P_{PREV}$ equal to the determined controlled position $P_{CNTL}(t_{V1})$ at step 428. If, at step 422, the previous shade position $P_{PREV}$ is equal to the lowest shade position $P_{LOW}$ during the present time interval, the system controller may not create a timeclock event at the first variable time $t_{V1}$. The system controller may then begin to examine the next time interval by setting the first variable time $t_{V1}$ equal to the second variable time $t_{V2}$ at step 430. The timeclock event creation procedure 400 loops around such that the system controller may determine if there is enough time left before the end time $t_{END}$ for the present timeclock event at step 412. If the first variable time $t_{V1}$ plus the minimum time period $T_{MIN}$ is greater than the end time $t_{END}$ at step 412, the system controller may enable the timeclock schedule at step 432 and the timeclock event creation procedure 400 may exit.

Figure 9:
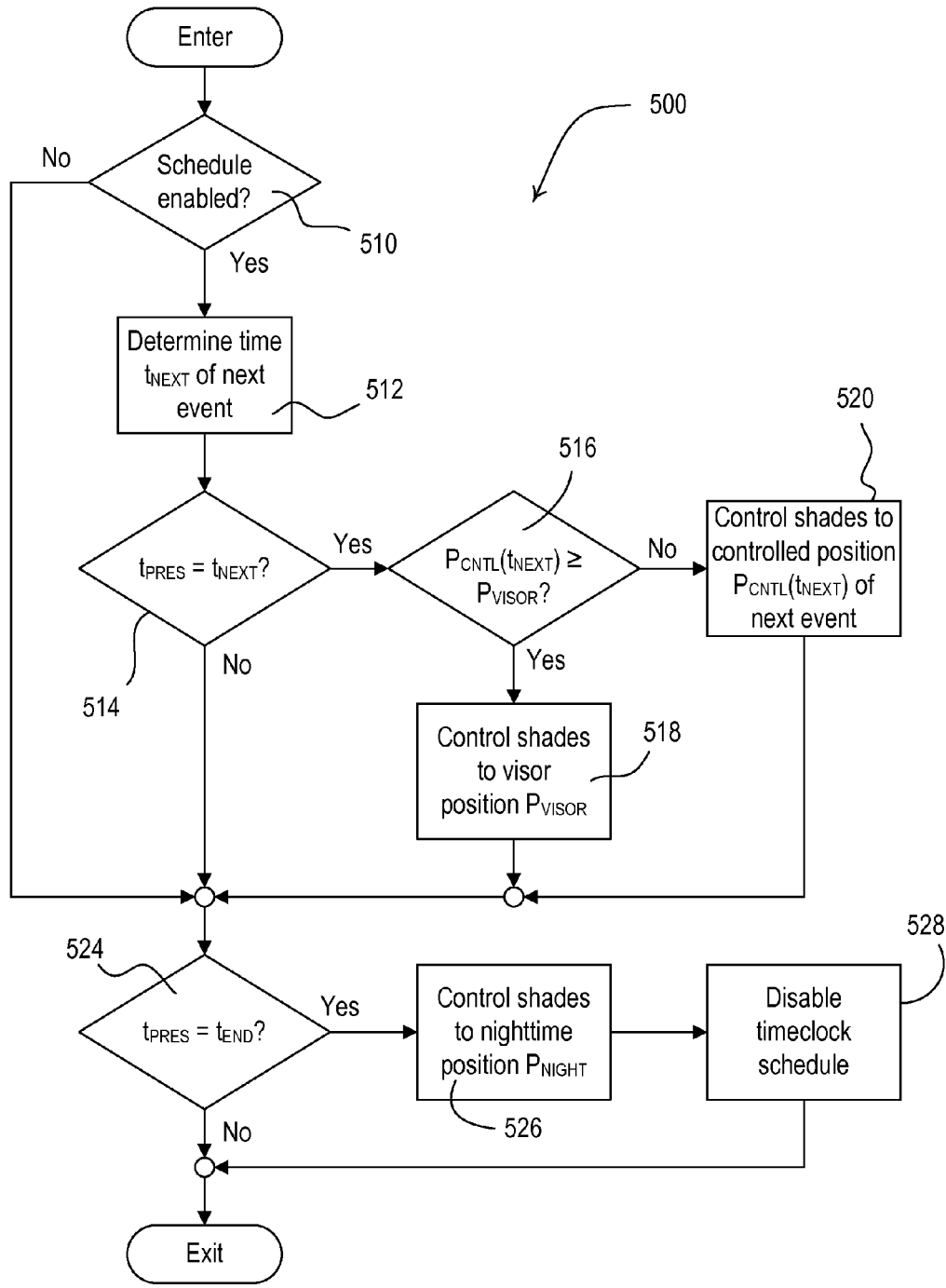
FIG. 9 is a simplified flowchart of a timeclock schedule execution procedure executed by a system controller of a load control system.

FIG. 9 is a simplified flowchart of a timeclock schedule execution procedure 500, which may be executed by the system controller periodically, e.g., every minute between the start time $t_{START}$ and the end time $t_{END}$ of the timeclock schedule. Since there may be multiple timeclock schedules for the motorized roller shades controlled by each of the system controllers, each system controller may execute the timeclock schedule execution procedure 500 multiple times, e.g., once for each timeclock schedule. During the timeclock schedule execution procedure 500, the system controller may adjust the positions of the motorized roller shades to the controlled positions $P_{CNTL}(t)$ determined in the timeclock event creation procedure 400.

In some cases, when the system controller controls the motorized roller shades to the fully-open positions $P_{FO}$ (e.g., when there is no direct sunlight incident on the façade), the amount of daylight entering the space may be unacceptable to a user of the space. Therefore, the system controller may be configured to set the open-limit positions of the motorized roller shades of one or more of the spaces or façades of the building to a visor position $P_{VISOR}$, which may be lower than the fully-open position $P_{FO}$, but may be equal to the fully-open position. Thus, the visor position $P_{VISOR}$ may define the highest position to which the motorized roller shades may be controlled during the timeclock schedule. The position of the visor position $P_{VISOR}$ may be entered using the GUI software of the network device. In addition, the visor position $P_{VISOR}$ may be enabled and disabled for each of the spaces or façades of the building using the GUI software of the network device. Since two adjacent windows of the building may have different heights, the visor positions $P_{VISOR}$ of the two windows may be programmed using the GUI software, such that the hembars of the shade fabrics covering the adjacent window are aligned when the motorized roller shades are controlled to the visor positions $P_{VISOR}$.

Referring to FIG. 9, if the timeclock schedule is enabled at step 510, the system controller may determine the time $t_{NEXT}$ of the next timeclock event from the timeclock schedule at step 512. If the present time $t_{PRES}$ is equal to the next event time $t_{NEXT}$ at step 514 and the controlled position $P_{CNTL}(t_{NEXT})$ at the next event time $t_{NEXT}$ is greater than or equal to the visor position $P_{VISOR}$ at step 516, the system controller may adjust the positions of the motorized roller shades to the visor position $P_{VISOR}$ at the next event time $t_{NEXT}$ at step 518. Otherwise, the system controller may adjust the positions of the motorized roller shades to the controlled position $P_{CNTL}(t_{NEXT})$ at the next event time $t_{NEXT}$ at step 520. After adjusting the positions of the motorized roller shades at steps 518, 520, after determining that there is not a timeclock event at the present time at step 514, or after determining that the timeclock schedule is not enabled at step 510, the system controller may make a determination as to whether the present time is equal to the end time $t_{END}$ of the timeclock schedule at step 524. If not, the timeclock schedule execution procedure 500 may simply exit. If the present time is equal to the end time $t_{END}$ at step 524, the system controller may control the motorized roller shades to the nighttime position $P_{NIGHT}$ at step 526 and disables the timeclock schedule at step 528, before the timeclock schedule execution procedure 500 may exit.

Accordingly, the system controller may control the motorized roller shades to limit the sunlight penetration distance $d_{PEN}$, while minimizing occupant distractions, by adjusting the motorized roller shades at times that are spaced apart by multiples of the user-specified minimum time period $T_{MIN}$ between shade movements. Since the positions of the motorized roller shades in the building may each be adjusted at these specific times (e.g., at the multiples of the user-specified minimum time period $T_{MIN}$), the motorized roller shades may each move at the same times during the timeclock schedule, thus minimizing occupant distractions. Even adjustments of adjacent motorized roller shades located on different façades (for example, in a corner office) may move at the same times (e.g., at the multiples of the user-specified minimum time period $T_{MIN}$). If the minimum time period $T_{MIN}$ between shade movements is chosen to be a logical time period (e.g., one hour), the users of the building may know when to expect movements of the motorized roller shades, and thus may not be as distracted by the shade movements as compared to shade movements occurring at random times. Alternatively, the GUI software of the network device could allow the user to select the specific event times of the timeclock events (while ensuring that the minimum time period $T_{MIN}$ exists between consecutive timeclock events) in order to conform the timeclock schedule to a predetermined time schedule. For example, the event times of the timeclock schedule could be chosen according to a class schedule at a school building, such that the motorized roller shades may move between the periods of the class schedule.

Since the timeclock configuration procedure 200 shown in FIG. 4 uses a small number of inputs in order to automatically generate a timeclock schedule, the operation of the motorized roller shades may be easily and quickly reconfigured using the GUI software of the network device. While the local longitude $\lambda$ and latitude $\phi$ of the building, the façade angle $\phi_F$ for a specific façade of the building, the height $h_{WIN}$ of the window in a specific space, and/or the height $h_{WORK}$ of the table in the specific space of the building will not typically change after installation and configuration of the load control system 100, the user may just adjust the desired maximum sunlight penetration distance $d_{MAX}$ and/or the minimum time period $T_{MIN}$ between shade movements to adjust the operation of the motorized window shades in the space occupied by the user. The GUI software of the network device provides screens to allow for adjustment of the desired maximum sunlight penetration distance $d_{MAX}$ and/or the minimum time period $T_{MIN}$ between shade movements. After an adjustment of the desired maximum sunlight penetration distance $d_{MAX}$ and/or the minimum time period $T_{MIN}$ between shade movements, the network device may transmit the updated operational characteristics to the system controllers 110, and the system controllers may each generate a subsequent timeclock schedule using the timeclock configuration procedure 200 and immediately begin operating based on the subsequent timeclock schedule. The user can repetitively adjust the desired maximum sunlight penetration distance $d_{MAX}$ and the minimum time period $T_{MIN}$ between shade movements (e.g., use an iterative process) over the course of multiple days in order to achieve the desired operation of the motorized roller shades 140 in the space.

The motorized roller shades 140 may be controlled such that the hembars 184 (FIG. 2) of each of the motorized roller shades on one of the façades 174 of the building may be aligned (e.g., positioned at approximately the same vertical position) at each time during the timeclock schedule. Since each of the motorized roller shades 140 on a façade are adjusted at the same time, the system controller may calculate the same controlled position $P_{CNTL}(t)$ for each of the motorized roller shades on the façade at a specific event time (assuming that each of the motorized roller shades are controlled to limit the sunlight penetration distance $d_{PEN}$ to the same desired maximum sunlight penetration distance $d_{MAX}$). Therefore, the hembars 184 of the motorized roller shades 140 on a façade may be aligned independent of differences in the size, shape, or height of the windows of the façade.

Figure 10:
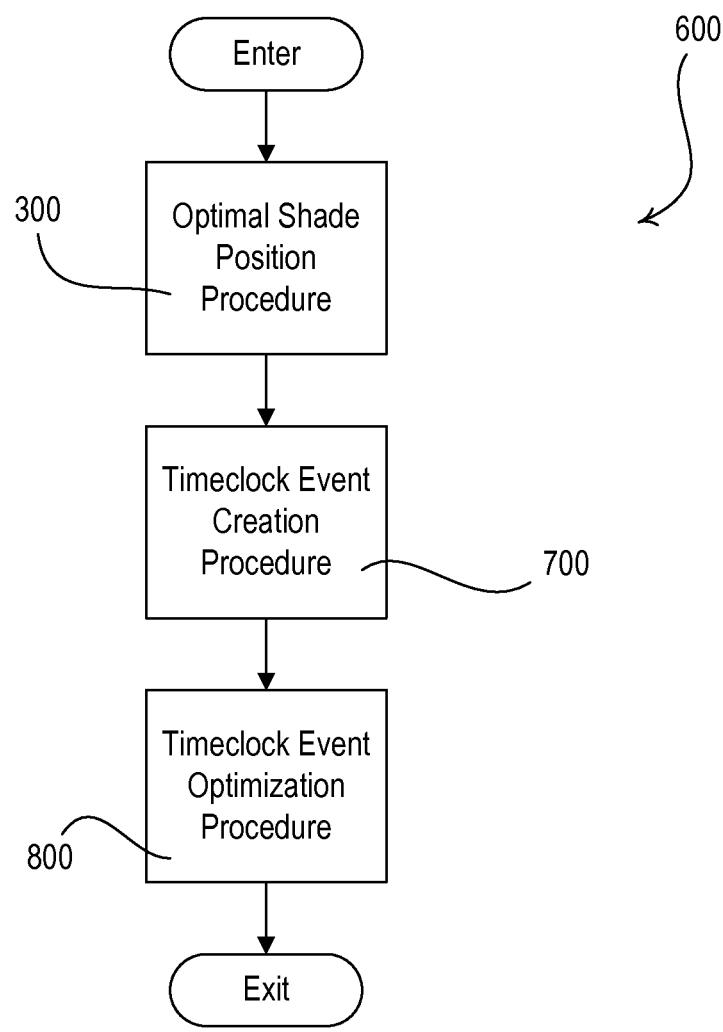
FIG. 10 is a simplified flowchart of another example timeclock configuration procedure executed periodically by a system controller of load control system of FIG. 1.

FIG. 10 is a simplified flowchart of another example timeclock configuration procedure 600 that may be executed periodically by a system controller of a load control system (e.g., the system controller 110 of the load control system 100) to generate a timeclock schedule defining the desired operation of motorized window treatments (e.g., the motorized roller shades 140) of each façade of a building. During the timeclock configuration procedure 600 of FIG. 10, the system controller may generate a timeclock schedule in response to a maximum number $N_{MAX}$ of movements of the motorized roller shades 140 that may occur during the present day, as well as in response to the minimum time period $T_{MIN}$ that may exist between any two consecutive movements of the motorized roller shades. The timeclock schedule may provide for control of the motorized roller shades 140 to limit the sunlight penetration distance $d_{PEN}$ to be less than the desired maximum sunlight penetration distance $d_{MAX}$.

The desired maximum sunlight penetration distance $d_{MAX}$, the maximum number $N_{MAX}$ of roller shade movements, and the minimum time period $T_{MIN}$ between shade movements may be stored in the memory in the system controller and may be entered by a user using the GUI software of the network device. For example, the maximum number $N_{MAX}$ of roller shade movements may have a minimum value of approximately three. Accordingly, the user may be able to control the maximum number $N_{MAX}$ of roller shade movements and the minimum time period $T_{MIN}$ between shade movements in order to minimize distractions of an occupant in the space due to roller shade movements. The user may select different values for the desired maximum sunlight penetration distance $d_{MAX}$, the maximum number $N_{MAX}$ of roller shade movements, and/or the minimum time period $T_{MIN}$ between shade movements for different areas and different groups of motorized roller shades 140 in the building.

During the timeclock configuration procedure 600, the system controller may first perform the optimal shade position procedure 300 for determining the optimal shade positions $P_{OPT}(t)$ of the motorized roller shades 140 in response to the desired maximum sunlight penetration distance $d_{MAX}$ for each interval (e.g., minute) between the start time $t_{START}$ and the end time $t_{END}$ of the present day (as described above with reference to FIG. 5). The system controller may then execute a timeclock event creation procedure 700 (shown in FIGS. 11A-11C) to generate the events of the timeclock schedule in response to the optimal shade positions $P_{OPT}(t)$, the maximum number $N_{MAX}$ of roller shade movements, and the minimum time period $T_{MIN}$ between shade movements. Referring to FIGS. 6A-6C, the plots of the optimal shade positions $P_{OPT1}(t)$, $P_{OPT2}(t)$, $P_{OPT3}(t)$ may each include a different number of "flat regions" 350 and "movement regions" 355. A flat region is defined as a portion of a plot of the optimal shade positions $P_{OPT}(t)$ that does not change in position for at least the minimum time period $T_{MIN}$. A movement region is defined as a portion of a plot of the optimal shade positions $P_{OPT}(t)$ during which the position changes (e.g., between two flat regions 350). The system controller may analyze the flat regions and the movement regions of the plots of the optimal shade positions $P_{OPT1}(t)$, $P_{OPT2}(t)$, $P_{OPT3}(t)$ in order to determine the event times of the timeclock schedule. During the timeclock event creation procedure 700, the system controller may generate controlled shade positions $P_{CNTL}(t)$, which may comprise a number of discrete changes in the position of the motorized roller shades at the specific event times.

Referring back to FIG. 10, the system controller may conclude the timeclock configuration procedure 600 by executing a timeclock event optimization procedure 800 to optimize the operation of the timeclock schedule by eliminating unnecessary timeclock events. The events of the resulting timeclock schedule may occur at any time between the start time $t_{START}$ and the end time $t_{END}$, as long as two consecutive events do not occur within the minimum time period $T_{MIN}$ and the number of timeclock events does not exceed the maximum number $N_{MAX}$ of roller shade movements. The controlled shade positions $P_{CNTL}(t)$ of the resulting timeclock schedule may be used by the system controller to adjust the position of the motorized roller shades during the timeclock schedule execution procedure 500 (as shown in FIG. 9).

Figure 13A:
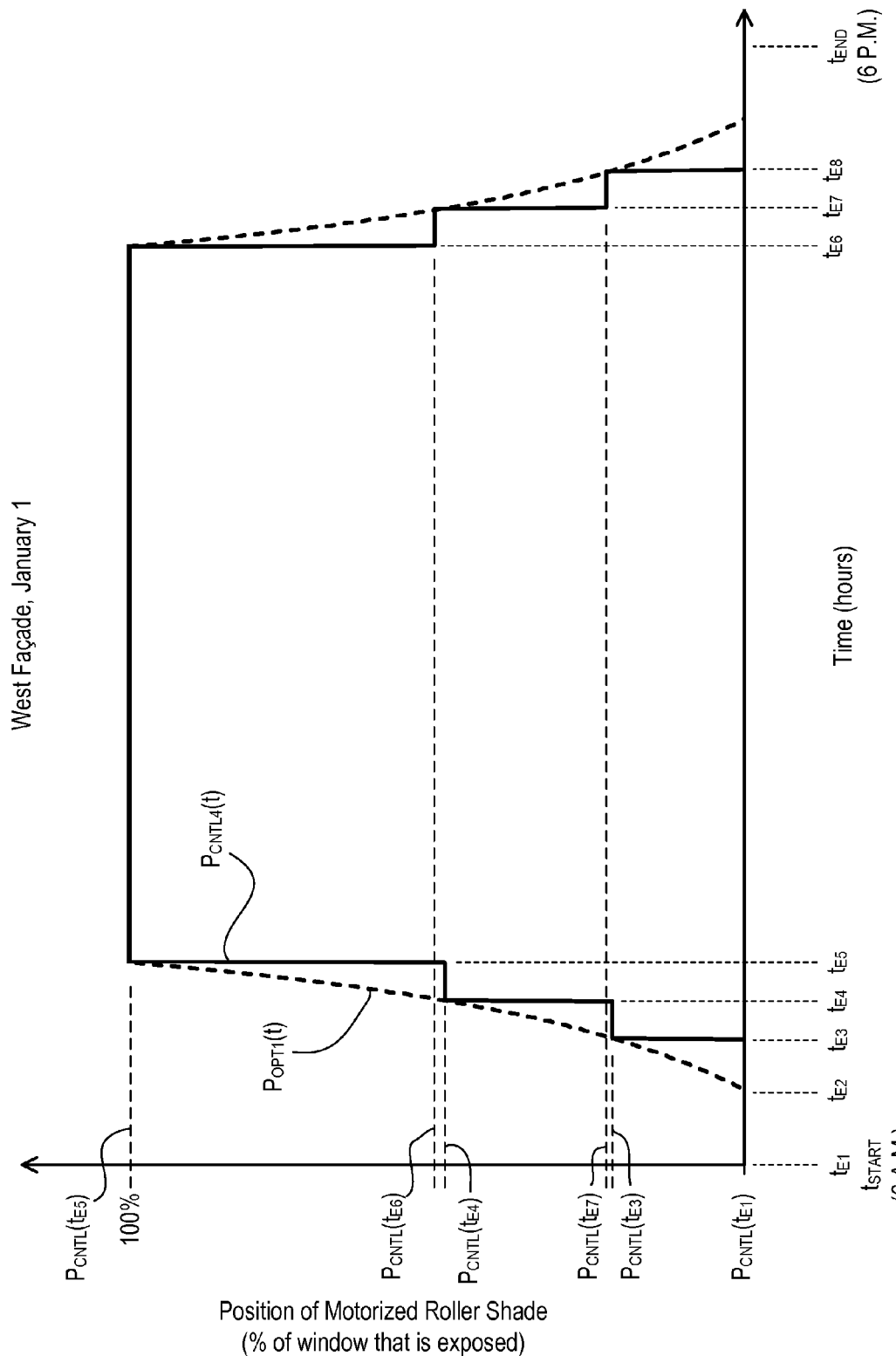
FIGS. 13A-13C show example plots of controlled shade positions of the motorized roller shades on different facades of the building during different days of the year as generated by the timeclock event creation procedure of FIGS. 11A-11C and the timeclock event optimization procedure of FIG. 12.
Figure 13B:
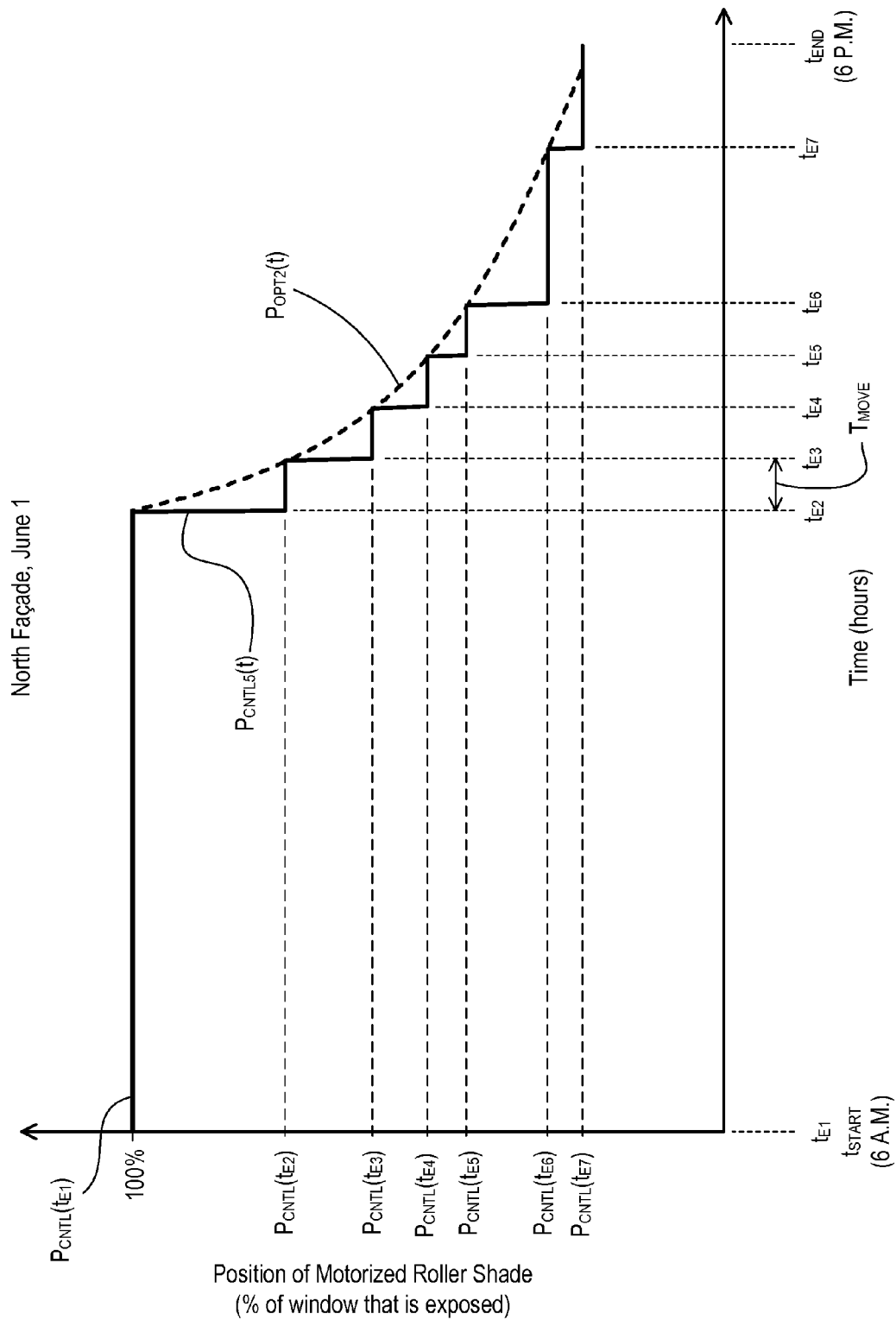
Figure 13C:
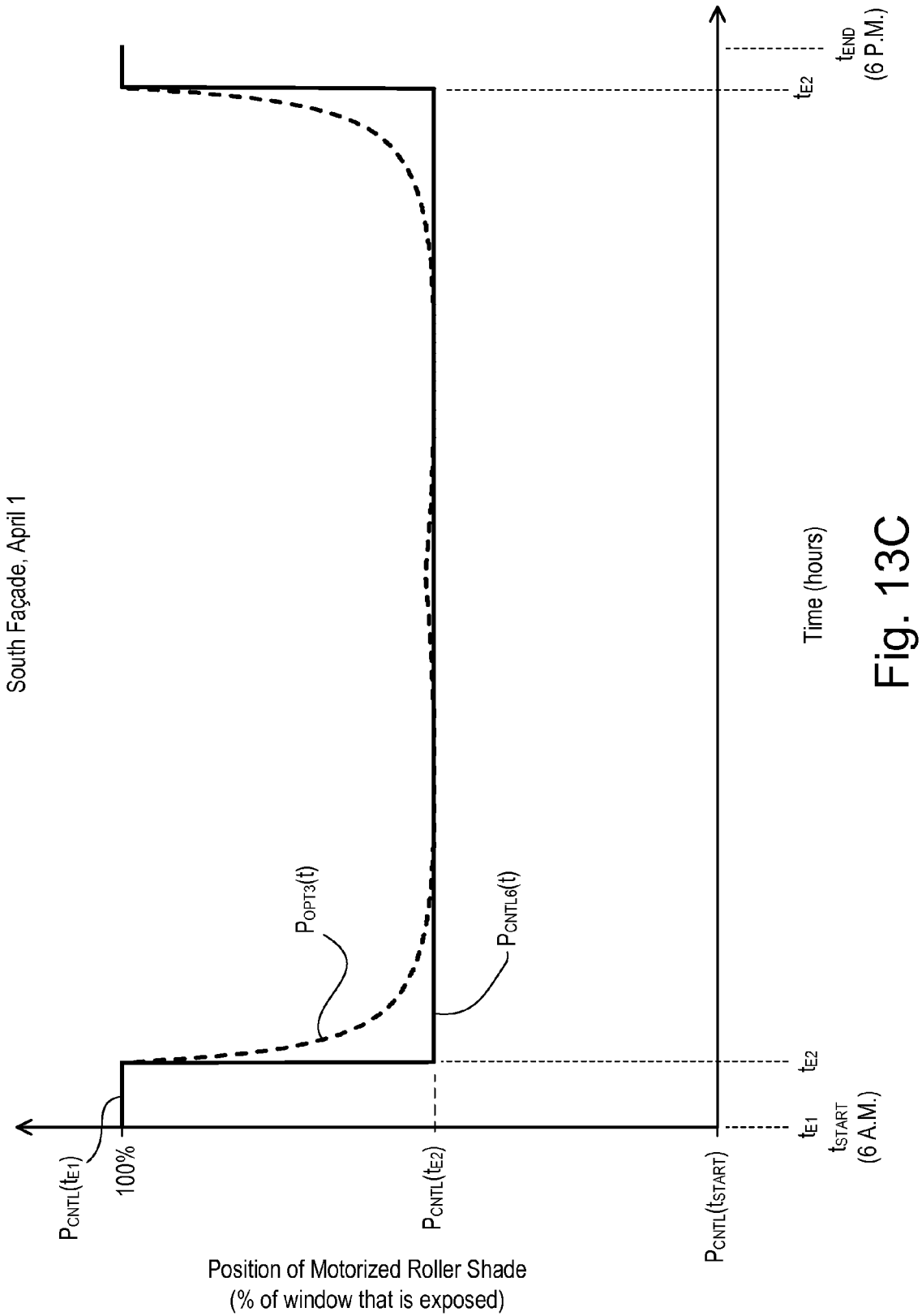

FIG. 13A shows an example plot of controlled shade positions $P_{CNTL4}(t)$ of the motorized roller shades on the west façade of the building on January 1 as determined during the timeclock configuration procedure 600 of FIG. 10. FIG. 13B shows an example plot of controlled shade positions $P_{CNTL5}(t)$ of the motorized roller shades on the north façade of the building on June 1 as determined during the timeclock configuration procedure 600 of FIG. 10. FIG. 13C shows an example plot of controlled shade positions $P_{CNTL6}(t)$ of the motorized roller shades on the south façade of the building on April 1 as determined during the timeclock configuration procedure 600 of FIG. 10.

Figure 11A:
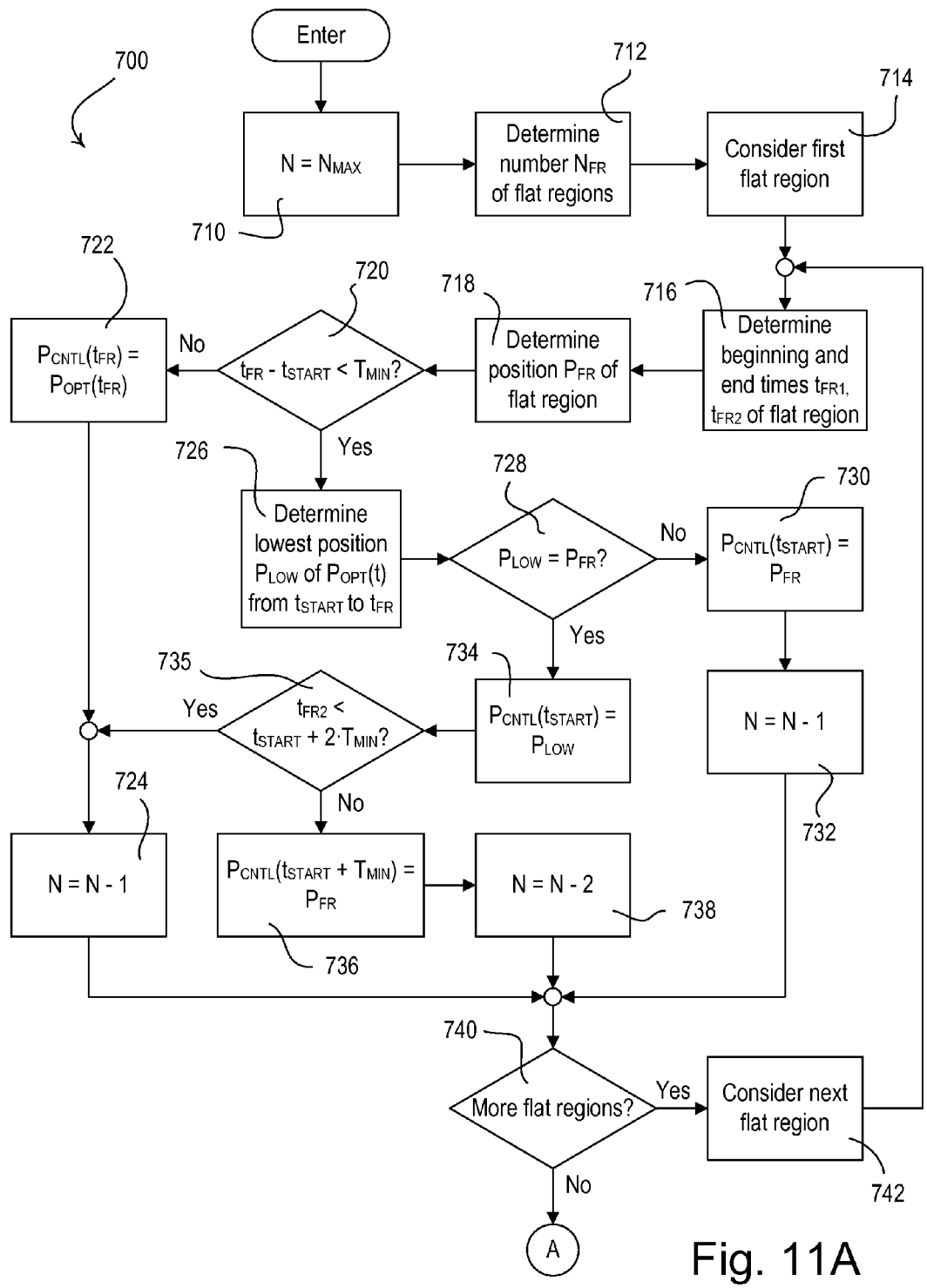
FIGS. 11A-11C are simplified flowcharts of a timeclock event creation procedure executed during the timeclock configuration procedure of FIG. 10.
Figure 11B:
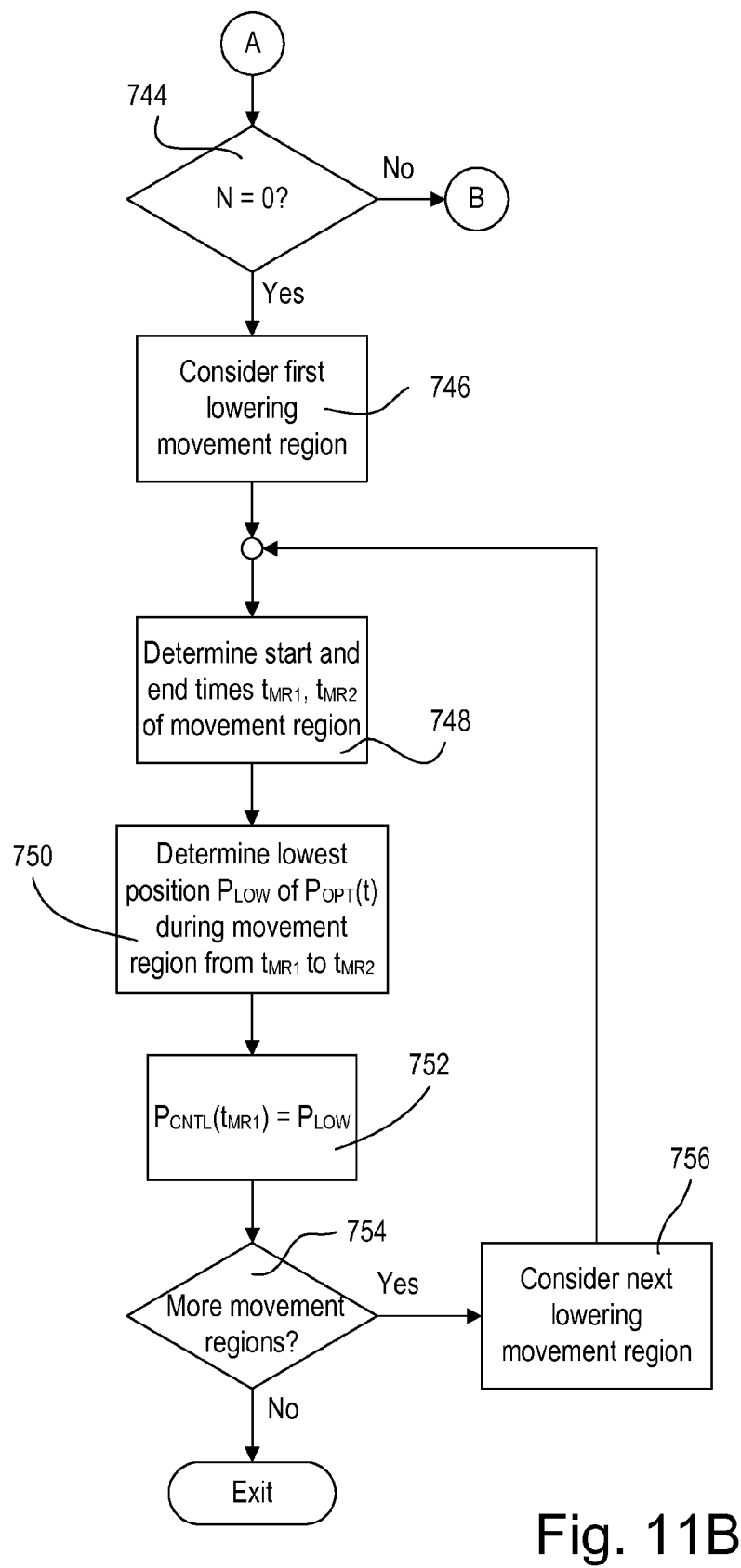
Figure 11C:
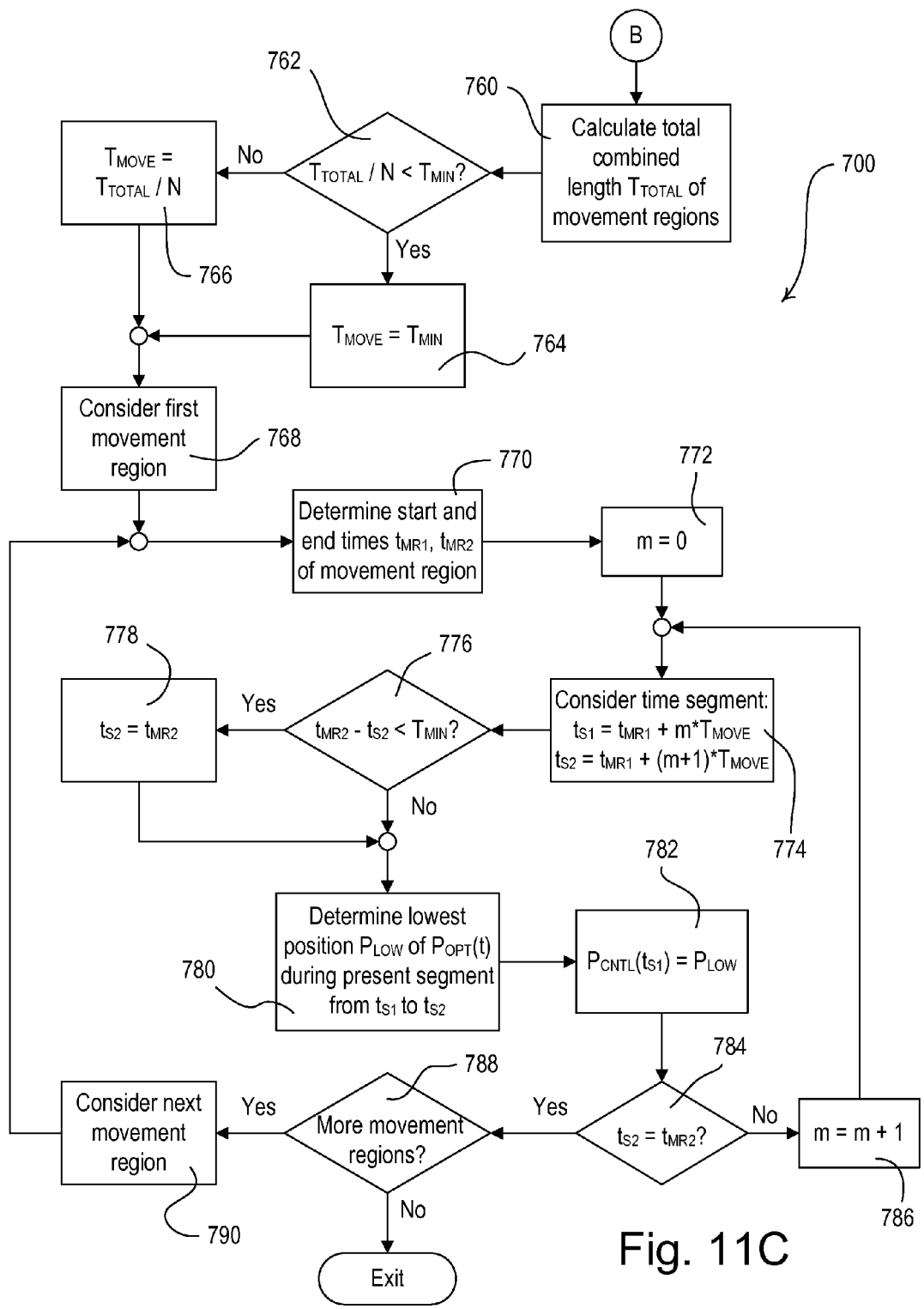

FIGS. 11A-11C are simplified flowcharts of the timeclock event creation procedure 700, which may be executed by the system controller in order to generate the events of the timeclock schedule during the timeclock configuration procedure 600 shown in FIG. 10. The system controller may set a variable N equal to the maximum number $N_{MAX}$ of roller shade movements at step 710. The system controller may use the variable N to keep track of how many more timeclock events may be generated without exceeding the maximum number $N_{MAX}$. The system controller may determine the number $N_{FR}$ of flat regions of the optimal shade positions $P_{OPT}(t)$ between the start time $t_{START}$ and the end time $t_{END}$ at step 712, and then generate timeclock events at the beginning of each of the flat regions. The system controller may begin by considering the first flat region at step 714, before determining the beginning time $t_{FR1}$ and the end time $t_{FR2}$ of the first flat region at step 716 and determining the constant shade position $P_{FR}$ associated with the first flat region at step 718. If the first flat region does not begin less than the minimum time period $T_{MIN}$ after the start time $t_{START}$ (e.g., if $t_{FR1}-t_{START} \geq T_{MIN}$) at step 720, the system controller may generate an event at the beginning of the flat region at step 722. Specifically, the system controller may set the controlled shade position $P_{CNTL}(t_{FR1})$ at the beginning time $t_{FR1}$ of the first flat region to be equal to the optimal shade position $P_{OPT}(t_{FR1})$ at the beginning time $t_{FR1}$ at step 722 and decrement the variable N by one at step 724 (e.g., as shown at time $t_{E1}$ in FIG. 13C).

If the first flat region begins less than the minimum time period $T_{MIN}$ after the start time $t_{START}$ (e.g., if $t_{FR1}-t_{START} \geq T_{MIN}$) at step 720, the system controller may determine the lowest shade position $P_{LOW}$ of the optimal shade position $P_{OPT}(t_{START})$ between the start time $t_{START}$ of the timeclock schedule and the beginning time $t_{FR1}$ of the flat region at step 726. If the lowest shade position $P_{LOW}$ is not equal to the constant shade position $P_{FR}$ of the flat region at step 728 (e.g., if the plot of the optimal shade positions $P_{OPT}(t)$ is moving downward at the start time $t_{START}$), the system controller may set the controlled shade position $P_{CNTL}(t_{START})$ at the start time $t_{START}$ of the timeclock schedule to be equal to the constant shade position $P_{FR}$ of the flat region at step 730 and decrement the variable N by one at step 732. If the lowest shade position $P_{LOW}$ is equal to the constant shade position $P_{FR}$ of the flat region at step 728 (e.g., if the plot of the optimal shade positions $P_{OPT}(t)$ is moving upward at the start time $t_{START}$), the system controller may set the controlled shade position $P_{CNTL}(t_{START})$ at the start time $t_{START}$ of the timeclock schedule to be equal to the lowest shade position $P_{LOW}$ at step 734. If the present flat region is too small to create another timeclock event before the end time $t_{FR2}$ of the flat region (e.g., if $t_{FR2} < t_{START}+2 \cdot T_{MIN}$) at step 735, the system controller may simply decrement the variable N by one at step 724.

However, if the present flat region is long enough to create another timeclock event before the end time $t_{FR2}$ of the flat region (e.g., if $t_{FR2} \geq t_{START}+2 \cdot T_{MIN}$) at step 735, the system controller may set the controlled shade position $P_{CNTL}(t_{START}+T_{MIN})$ to be equal to the constant shade position $P_{FR}$ of the flat region at a time that is the minimum time period $T_{MIN}$ after the start time $t_{START}$ (e.g., $t_{START}+T_{MIN}$) at step 736, and decrement the variable N by two at step 738. After generating timeclock events at steps 722, 730, 734, 736, the system controller may determine if there are more flat regions to consider at step 740. If so, the system controller may consider the next flat region at step 742, before determining the beginning time $t_{FR1}$ of the next flat region at step 716, determining the constant shade position $P_{FR}$ associated with the next flat region at step 718, and generating appropriate timeclock events at steps 722, 730, 734, 736.

Referring to FIG. 11B, if there are not more flat regions to consider at step 740, and the variable N is equal to zero at step 744 (e.g., the number of events generated so far is equal to the maximum number $N_{MAX}$ of roller shade movements), the system controller may determine if there should be one or more timeclock events during the movement regions (rather than those timeclock events created for the flat regions at steps 722, 730, 734, 736). Specifically, the system controller may considers the first lowering movement regions (e.g., a movement region during which the position of the motorized roller shade is moving towards 0%) at step 746, and determines the start time $t_{MR1}$ and the end time $t_{MR2}$ of the first lowering movement region at step 748. Next, the system controller may determine the lowest shade position $P_{LOW}$ of the optimal shade positions $P_{OPT}(t)$ during the present lowering movement region (e.g., between the time $t_{MR1}$ and the time $t_{MR2}$) at step 750. At step 752, the system controller may then set the controlled shade position $P_{CNTL}(t_{MR1})$ at the beginning time $t_{MR1}$ of the present movement region to be equal to the lowest shade position $P_{LOW}$ of the optimal shade positions $P_{OPT}(t)$ during the present lowering movement region as determined in step 750 (e.g., as shown at time $t_{E6}$ in FIG. 13A). If there are more lowering movement regions to consider at step 754, the system controller may consider the next lowering movement region at step 756, and the timeclock event creation procedure 700 may loop around, to create a timeclock event for the next lowering movement region. If there are not more lowering movement regions to consider at step 754, the timeclock event creation procedure 700 may exit.

Referring to FIG. 11C, if the variable N is not equal to zero at step 744 (e.g., the number of events generated so far is greater than the maximum number $N_{MAX}$ of roller shade movements), the system controller may generate timeclock events during the movement regions of the optimal shade positions $P_{OPT}(t)$. At step 760, the system controller may calculate the total combined length $T_{TOTAL}$ of the movement regions. Next, the system controller may determine if the user-selected maximum number $N_{MAX}$ of roller shade movements or the user-selected minimum time period $T_{MIN}$ between shade movements is the limiting factor for determining a movement time $T_{MOVE}$, which may exist between the timeclock schedule events during the movement regions (e.g., as shown in FIG. 13B). Specifically, if the total combined length $T_{TOTAL}$ of the movement regions divided by the variable N (e.g., the number of remaining possible shade movements) is less than the minimum time period $T_{MIN}$ at step 762, the minimum time period $T_{MIN}$ may be the limiting factor and thus the system controller may set the movement time $T_{MOVE}$ equal to the minimum time period $T_{MIN}$ at step 764. If the total combined length $T_{TOTAL}$ of the movement regions divided by the variable N is not less than the minimum time period $T_{MIN}$ at step 762, the number of remaining possible shade movements (e.g., the variable N) may be the limiting factor and thus the system controller may set the movement time $T_{MOVE}$ equal to the total combined length $T_{TOTAL}$ of the movement regions divided by the variable N at step 766.

Next, the system controller may generate timeclock events during the movement regions of the optimal shade positions $P_{OPT}(t)$. The system controller may consider the first movement region at step 768, determine the start time $t_{MR1}$ and the end time $t_{MR2}$ of the first movement region at step 770, and set a variable m to zero at step 772. At step 774, the system controller may consider a time segment that begins at a time $t_{S1}$ and ends at a time $t_{S2}$ as defined by:

$$t_{S1} = t_{MR1} + m \cdot T_{MOVE}; \text{ and} \quad \text{(Equation 13)}$$

$$t_{S2} = t_{MR1} + (m+1) \cdot T_{MOVE}. \quad \text{(Equation 14)}$$

If the time $t_{S2}$ of the present time segment is within the minimum time period $T_{MIN}$ of the end time $t_{MR2}$ of the present movement region at step 776 (e.g., if $t_{MR2} - t_{S2} < T_{MIN}$), a timeclock event may not be generated between the time $t_{S2}$ of the present time segment and the end time $t_{MR2}$ of the present movement region. Therefore, the system controller may set the time $t_{S2}$ of the present time segment equal to the end time $t_{MR2}$ of the present movement region at step 778.

After the time $t_{S2}$ of the present time segment is set equal to the end time $t_{MR2}$ of the present movement region at step 778, or if the time $t_{S2}$ of the present time segment is not within the minimum time period $T_{MIN}$ of the end time $t_{MR2}$ of the present movement region at step 776 (e.g., if $t_{MR2} - t_{S2} \geq T_{MIN}$), the system controller may determine the lowest shade position $P_{LOW}$ of the optimal shade positions $P_{OPT}(t)$ during the present time segment (e.g., between the time $t_{S1}$ and the time $t_{S2}$) at step 780. At step 782, the system controller may then set the controlled shade position $P_{CNTL}(t_{S1})$ at the time $t_{S1}$ to be equal to the lowest shade position $P_{LOW}$ of the optimal shade positions $P_{OPT}(t)$ during the present time segment as determined in step 780 (e.g., as shown at time $t_{E2}$ in FIG. 13B). If the time $t_{S2}$ of the present time segment is not equal to the end time $t_{MR2}$ of the present movement region at step 784, the system controller may increment the variable m at step 786, consider the next time segment at step 774, and generate another timeclock event at step 782. However, if the time $t_{S2}$ of the present time segment is equal to the end time $t_{MR2}$ of the present movement region at step 784 and there are more movement regions to consider at step 788, the system controller may consider the next movement region at step 790, and the timeclock event creation procedure 700 may loop around, such that the system controller may generate the timeclock events for the next movement region. If there are not more movement regions to consider at step 788, the timeclock event creation procedure 700 may exit.

Figure 12:
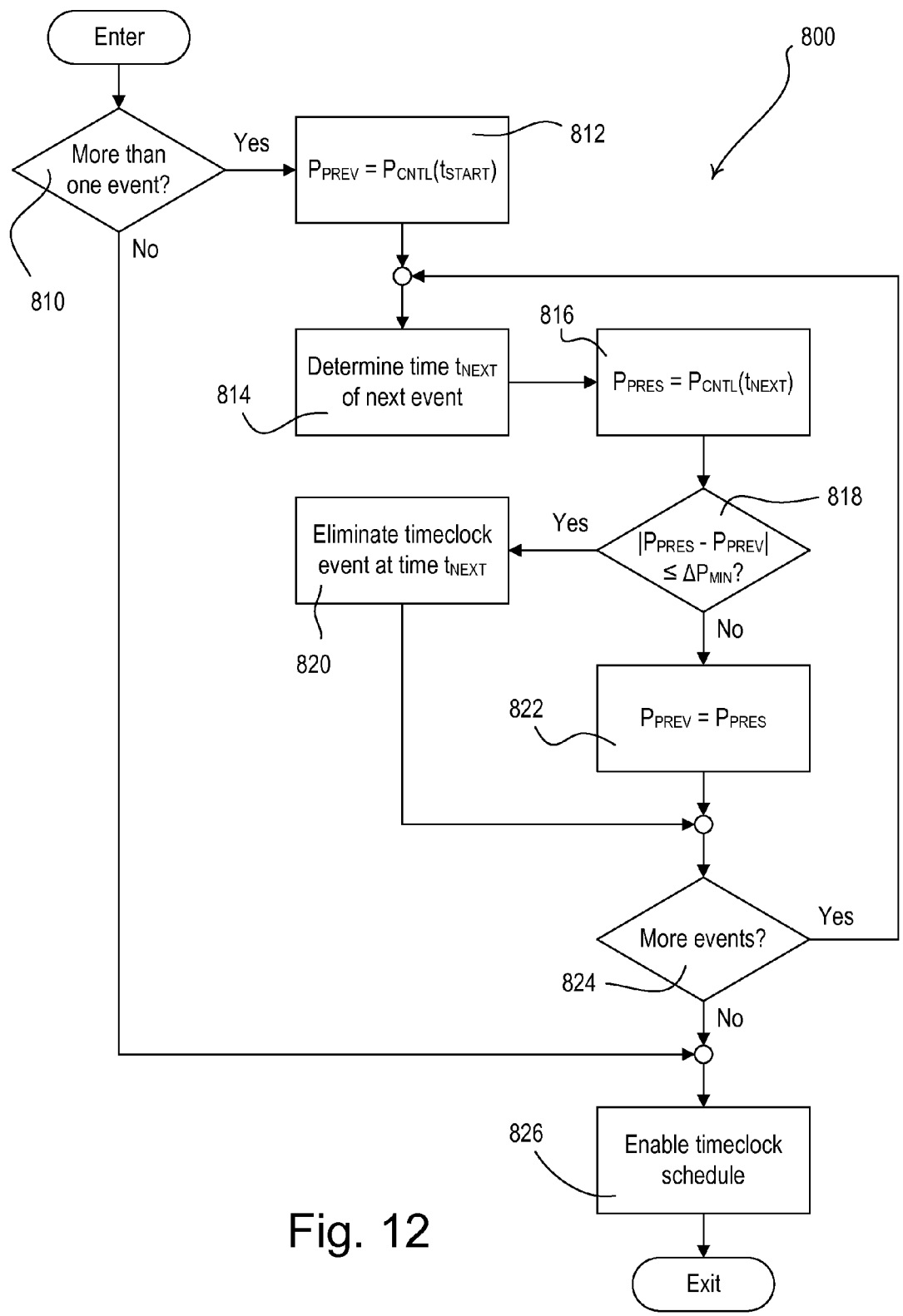
FIG. 12 is a simplified flowchart of the timeclock event optimization procedure executed during the timeclock configuration procedure of FIG. 10.

FIG. 12 is a simplified flowchart of the timeclock event optimization procedure 800, which may be executed by the system controller in order to optimize the operation of the timeclock schedule by eliminating unnecessary timeclock events during the timeclock configuration procedure 600 of FIG. 10. If there is more than one event in the timeclock schedule at step 810, the system controller may set a previous position variable $P_{PREV}$ to be equal to the controlled shade position $P_{CNTL}(t_{START})$ at the start time $t_{START}$ at step 812. The system controller may then determine a next event time $t_{NEXT}$ of the timeclock schedule at step 814, and set a present position variable $P_{PRES}$ equal to the controlled shade position $P_{CNTL}(t_{NEXT})$ at the next event time $t_{NEXT}$ at step 816. If the present position variable $P_{PRES}$ is within a minimum shade position distance $\Delta P_{MIN}$ (e.g., 5%) of the previous position variable $P_{PREV}$ at step 818, the system controller may eliminate the present event at time $t_{NEXT}$ at step 820. For example, the events at times $t_{E2}$ and/or $t_{E6}$ of the controlled shade position $P_{CNTL1}(t)$ in FIG. 13A may be eliminated. If the present position variable $P_{PRES}$ is greater than the minimum shade position distance $\Delta P_{MIN}$ away from the previous position variable $P_{PREV}$ at step 818, the system controller may keep the present event at time $t_{NEXT}$ and may set the previous position variable $P_{PREV}$ equal to the present position variable $P_{PRES}$ at step 822. If there are more events in the timeclock schedule at step 824, the system controller may determine the next event time $t_{NEXT}$ of the timeclock schedule at step 814, and set the present position variable $P_{PRES}$ equal to the controlled shade position $P_{CNTL}(t_{NEXT})$ at the next event time $t_{NEXT}$ at step 816, before determining whether to eliminate the present event at step 820. If there are not more events in the timeclock schedule at step 824, the system controller may enable the timeclock schedule at step 826 and the timeclock event optimization procedure 800 may exit.

Alternatively, the system controller may not generate a timeclock schedule prior to controlling the motorized roller shade 140 during normal operation in order to prevent the sunlight penetration distance $d_{PEN}$ from exceeding the desired maximum sunlight penetration distance $d_{MAX}$ while minimizing user distractions. The system controller may calculate the positions to which to control the motorized roller shades 140 "on-the-fly", e.g., immediately before adjusting the positions of the motorized roller shades. The system controller may adjust the positions of the motorized roller shades 140 periodically, e.g., at times spaced apart by multiples of the minimum time period $T_{MIN}$ that may exist between any two consecutive movements of the motorized roller shades. Accordingly, the system controller may control the positions of the motorized roller shades 140 to positions similar to the controlled shade positions $P_{CNTL1}(t)$, $P_{CNTL2}(t)$, $P_{CNTL3}(t)$ of the timeclock configuration procedure 200 (e.g., as shown in FIGS. 8A-8C).

Figure 14:
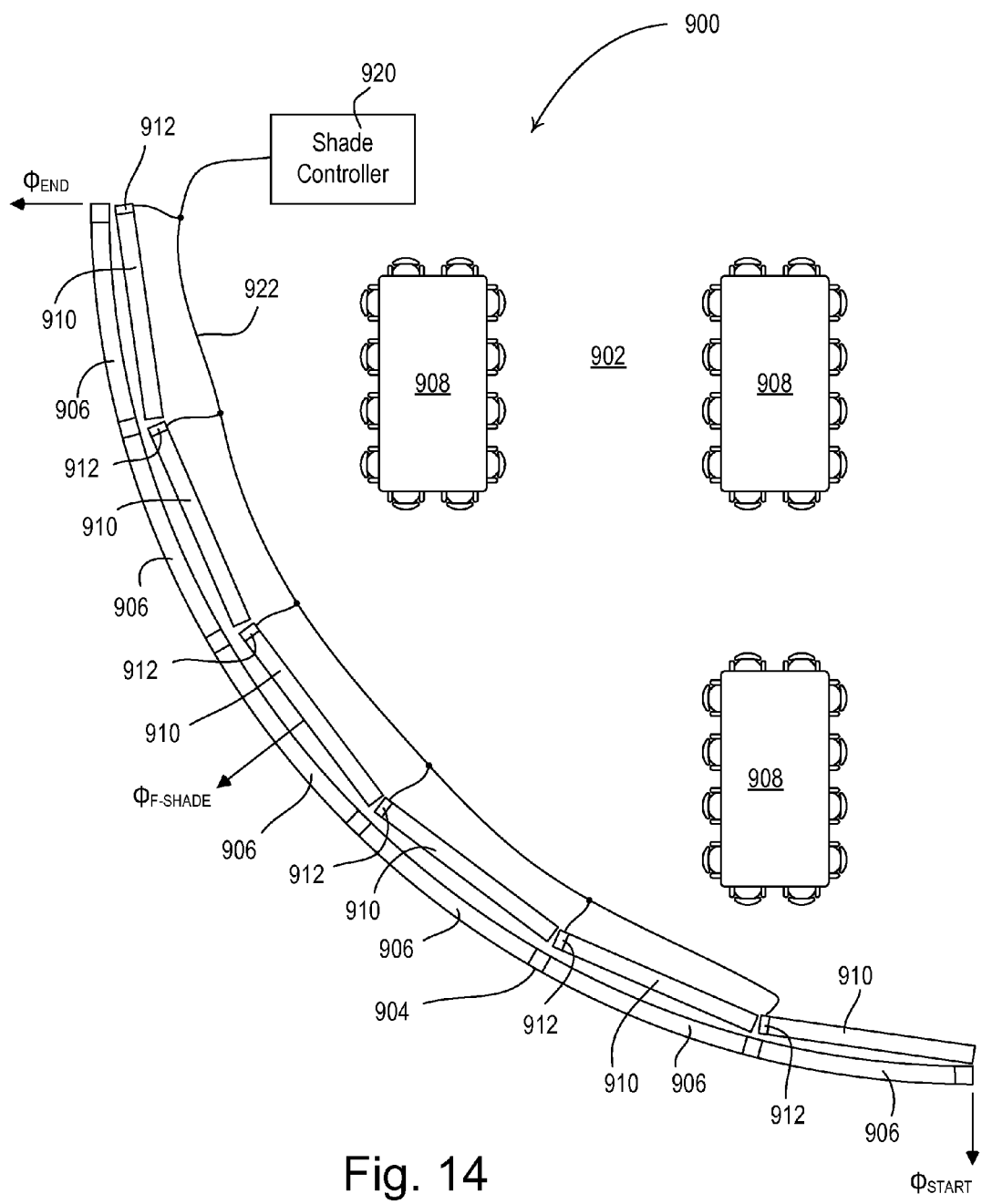
FIG. 14 is a simplified top view of an example of a load control system installed in a space (e.g., of a building having a non-linear façade).

FIG. 14 is a simplified top view of an example of a load control system 900 installed in a space 902 (e.g., an office space or room in a residence) of a building having a non-linear façade 904. For example, the non-linear façade 904 may be curved and may include a number of windows 906 (e.g., curved windows) for allowing sunlight to enter the space 902. Alternatively, the windows 906 may be straight and/or the façade 904 may be arranged in some other continuously-curved or piecewise non-linear shape. In addition, the non-linear façade 904 could alternatively comprise two or more adjacent linear façades (e.g., a compound façade). The space 902 may also comprise a number of work surfaces, e.g., tables 908. A motorized window treatment, e.g., a motorized roller shade 910 (such as the motorized roller shade 140 shown in FIGS. 1 and 2), may be mounted adjacent each one of the windows 906 to control the amount of daylight entering the space 902. Each motorized roller shade 910 may comprise a respective electronic drive unit 912 for moving a shade fabric of the motorized roller shade to adjust the amount of daylight entering the space 902. The motorized roller shades 910 shown in FIG. 14 are arranged along a portion of the total façade of the building (e.g., a quarter of the total façade of a cylindrical building) that extends clockwise from a start façade angle $\phi_{START}$ and an end façade angle $\phi_{END}$ (e.g., approximately 180° and 270°, respectively). The load control system 900 may comprise additional motorized roller shades 910 located in other parts and/or floors of the building.

The load control system 900 may further comprise a system controller, e.g., a shade controller 920, which may be coupled to the electronic drive units 912 of the motorized roller shades 910 via a communication link, e.g., a wired digital communication link 922. The shade controller 920 may be configured to control the motorized roller shades 910 to control a sunlight penetration distance $d_{PEN}$ in the space 902. The shade controller 920 may comprise an astronomical timeclock for determining a sunrise time $t_{SUNRISE}$ and a sunset time $t_{SUNSET}$ for each day of the year at the location of the building. The shade controller 920 may transmit digital messages to the electronic drive units 912 via the digital communication link 922 to automatically control the motorized roller shades 910 in response to a timeclock schedule (e.g., that may be executed between the sunrise time $t_{SUNRISE}$ and a sunset time $t_{SUNSET}$). For example, the shade controller 920 may control the motorized roller shades 910 to limit the sunlight penetration distance $d_{PEN}$ in the space 902 to a desired maximum sunlight penetration distance $d_{MAX}$ in the direction of the sun (e.g., along the solar azimuth angle $\phi_S$). Alternatively, the communication link between the shade controller 920 and the electronic drive units 912 could comprise a wireless communication link, such as a radio-frequency (RF) communication link or an infrared (IR) communication link.

The shade controller 920 may control the motorized roller shades 910 in one or more groups, such that all of the motorized roller shades in a single group move at the same time to the same positions, which minimizes occupant distractions and improves the aesthetic appearance of the shade fabric of the motorized roller shades 910. For example, the shade controller 920 may control the motorized roller shades 910 in one or more groups. The motorized roller shades 910 of a single group of the load control system 900 may be located adjacent to each other along a portion of the total façade of the building, for example, along a quarter of the total façade as shown in FIG. 14. The portion of the curved façade adjacent each group of shades may be characterized by at least two distinct façade angles (e.g., the start façade angle $\phi_{START}$ and an end façade angle $\phi_{END}$ as shown in FIG. 14). Each of the motorized roller shades 910 may be oriented at an angle between (or equal to) the start façade angle $\phi_{START}$ and the end façade angle $\phi_{END}$ (e.g., as shown by an example shade-façade angle $\phi_{F-SHADE}$ in FIG. 14).

Figure 15:
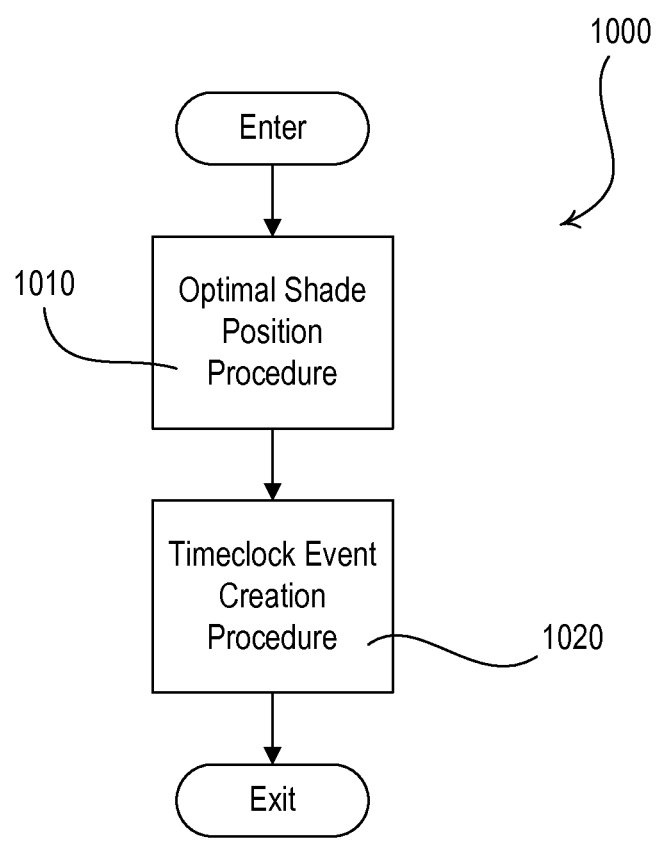
FIG. 15 is a simplified flowchart of an example timeclock configuration procedure executed periodically by a system controller (e.g., a shade controller) of a load control system.

FIG. 15 is a simplified flowchart of an example timeclock configuration procedure 1000 that may be executed periodically by a system controller of a load control system (e.g., the shade controller 920 of the load control system 900 shown in FIG. 21). For example, the timeclock configuration procedure 1000 may be executed by the shade controller 920 before the beginning of each day to build a timeclock schedule for controlling the motorized roller shades 910 during that coming day. During an optimal shade position procedure 1010, the shade controller 920 may calculate the solar azimuth angle $\phi_S$ using the local longitude and latitude of the building and the present local time and date. The shade controller 920 may use the solar azimuth angle $\phi_S$, the solar elevation angle $\theta_S$, and the at least two distinct façade angles of the curved façade 904 to determine optimal shade positions $P_{OPT}(t)$ of the motorized roller shades 910 that will limit the sunlight penetration distance $d_{PEN}$ in the space 902 to the desired maximum sunlight penetration distance $d_{MAX}$ for each interval (e.g., minute) between a start time $t_{START}$ and an end time $t_{END}$ of the timeclock schedule. The shade controller 920 may use the optimal shade positions $P_{OPT}(t)$ to build the timeclock schedule during a timeclock event creation procedure 1020 (e.g., in a similar manner as in the timeclock event creation procedure 400 shown in FIG. 7). Each of the motorized roller shades 910 of the group may be controlled to the same positions in response to the timeclock schedule.

For example, during the optimal shade position procedure 1010, the shade controller 920 may use a shade-façade angle $\phi_{F-SHADE}$ of each of the motorized roller shades 910 in the group to calculate the optimal shade positions $P_{OPT}(t)$ for each motorized roller shade in the group for each interval (e.g., minute) of the timeclock schedule. The shade controller 920 may then pick the lowest position of the optimal shade positions $P_{OPT}(t)$ of each motorized roller shade in the group to be an optimal shade group position $P_{OPT-G}(t)$ at each interval (e.g., minute) of the timeclock schedule. The shade controller 920 may use the optimal shade group positions $P_{OPT-G}(t)$ to build the timeclock schedule during the timeclock event creation procedure 1020.

The shade controller 920 could alternatively use the start façade angle $\phi_{START}$ and the end façade angle $\phi_{END}$ of the non-linear façade (e.g., as shown in FIG. 14) to calculate respective optimal shade positions $P_{START}(t)$, $P_{END}(t)$ at each end of the portion of the façade along which the motorized roller shades are oriented. The shade controller 920 could then pick the lowest position of the start and end optimal shade positions $P_{START}(t)$, $P_{END}(t)$ to be an optimal shade group position $P_{OPT-G}(t)$ at each interval (e.g., minute) of the timeclock schedule. In addition, the shade controller 920 could alternatively use the shade-façade angles $\phi_{F-SHADE}$ of the motorized roller shades at each end of the portion of the non-linear façade along which the group of motorized roller shades are arranged to calculate the optimal shade positions $P_{START}(t)$, $P_{END}(t)$.

Alternatively, the shade controller 920 could determine a representative façade angle $\phi_{F-REP}$ from the at least two distinct façade angles of the curved façade (e.g., the start angle $\phi_{START}$ and the end angle $\phi_{END}$) and then use the representative façade angle $\phi_{F-REP}$ to calculate the optimal shade positions $P_{OPT}(t)$ for the motorized roller shades in the group for each interval (e.g., minute) of the timeclock schedule. The representative façade angle $\phi_{F-REP}$ may be a function of the solar azimuth angle $\phi_S$ and may represent the worst-case solar penetration into the space. For example, the system controller 920 may recalculate the representative façade angle $\phi_{F-REP}$ for each interval (e.g., minute) between the start time $t_{START}$ and the end time $t_{END}$ of the timeclock schedule to determine the optimal shade positions $P_{OPT}(t)$.

Figure 16:
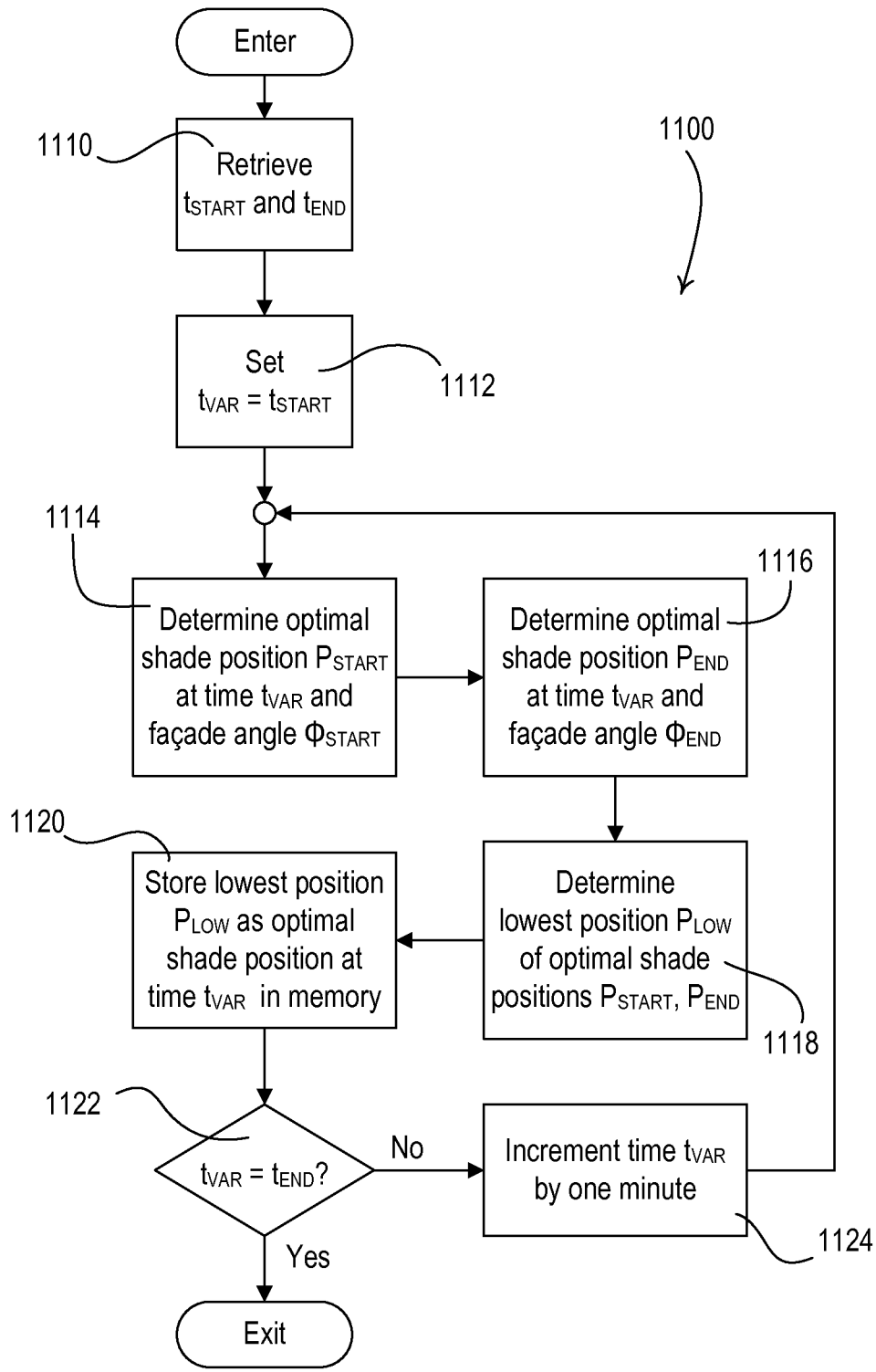
FIGS. 16-18 show simplified flowcharts of example optimal shade position procedures that may be executed periodically by a system controller (e.g., a shade controller) of a load control system.

FIG. 16 is a simplified flowchart of an example optimal shade position procedure 1100 that may be executed by a system controller to determine optimal shade group positions $P_{OPT-G}(t)$ for a plurality of motorized window treatments (e.g., motorized roller shades) arranged along a non-linear façade (or multiple adjacent linear façades) of a building to limit the sunlight penetration distance $d_{PEN}$ in a space of the building to a desired maximum sunlight penetration distance $d_{MAX}$ for each interval (e.g., minute) between a start time $t_{START}$ and an end time $t_{END}$ of a timeclock schedule. For example, the optimal shade position procedure 1100 may be executed by the shade controller 920 of the load control system 900 during the timeclock configuration procedure 1000 shown in FIG. 15. At step 1110, the system controller may retrieve a start time $t_{START}$ and an end time $t_{END}$ of the timeclock schedule for the present day, e.g., using an astronomical timeclock to set the start time $t_{START}$ equal to the sunrise time $t_{SUNRISE}$ for the present day, and the end time $t_{END}$ equal to the sunset time $t_{SUNSET}$ for the present day. The system controller may set a variable time $t_{VAR}$ equal to the start time $t_{START}$ at step 1112.

During the optimal shade position procedure 1100, the system controller may use two distinct façade angles (e.g., the start façade angle $\phi_{START}$ and the end façade angle $\phi_{END}$ of the non-linear façade) to calculate the optimal shade group positions $P_{OPT-G}(t)$. Specifically, at step 1114, the system controller may determine a start-angle optimal shade position $P_{START}(t_{VAR})$ that may be used in order to limit the sunlight penetration distance $d_{PEN}$ to the desired maximum sunlight penetration distance $d_{MAX}$ at the variable time $t_{VAR}$ and at the start façade angle $\phi_{START}$ (e.g., using Equations 1-12 shown above). At step 1116, the system controller may determine an end-angle optimal shade position $P_{END}(t_{VAR})$ that may be used in order to limit the sunlight penetration distance $d_{PEN}$ to the desired maximum sunlight penetration distance $d_{MAX}$ at the variable time $t_{VAR}$ and at the end façade angle $\phi_{END}$. Alternatively, the system controller could use the shade-façade angles $\phi_{F-SHADE}$ of the motorized roller shades at each end of the portion of the non-linear façade along which the group of motorized roller shades are arranged at steps 1114 and 1116.

The system controller may determine a lowest optimal shade position $P_{LOW}(t_{VAR})$, for example, the lowest of the start-angle optimal shade position $P_{START}(t_{VAR})$ and the end-angle optimal shade position $P_{END}(t_{VAR})$ at step 1118. At step 1120, the system controller may store the lowest optimal shade position $P_{LOW}(t_{VAR})$ in memory as the optimal shade group position $P_{OPT-G}(t_{VAR})$ at the variable time $t_{VAR}$ (e.g., to be used in the timeclock event creation procedure 1020 of the timeclock configuration procedure 1000 shown in FIG. 15). If the variable time $t_{VAR}$ is not equal to the end time $t_{END}$ at step 1122, the system controller may increment the variable time $t_{VAR}$ by one interval (e.g., minute) at step 1124 and determine the optimal shade group position $P_{OPT-G}(t_{VAR})$ for the next variable time $t_{VAR}$ for being stored at step 1120. When the variable time $t_{VAR}$ is equal to the end time $t_{END}$ at step 1122, the optimal shade position procedure 1100 may exit.

Figure 17:
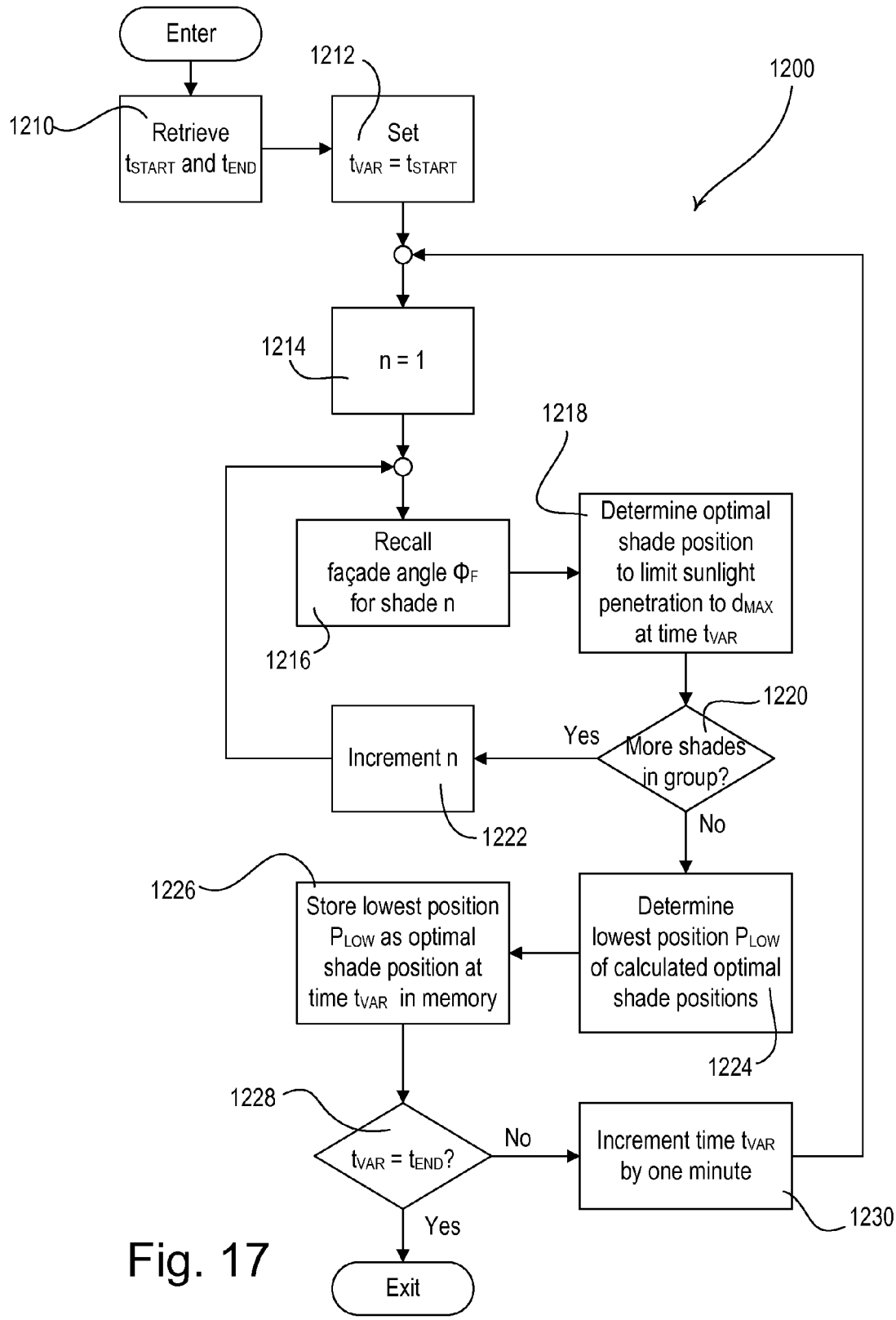

FIG. 17 is a simplified flowchart of another example optimal shade position procedure 1200 that may be executed by a system controller to determine optimal shade group positions for a plurality of motorized window treatments (e.g., a number $N_{SHADES}$ of motorized roller shades) arranged along a non-linear façade (or multiple adjacent linear façades) of a building. For example, the optimal shade position procedure 1200 may be executed by the shade controller 920 of the load control system 900 during the timeclock configuration procedure 1000 shown in FIG. 15. The system controller may retrieve a start time $t_{START}$ and an end time $t_{END}$ of a timeclock schedule for the present day at step 1210 and then set a variable time $t_{VAR}$ equal to the start time $t_{START}$ at step 1212.

During the optimal shade position procedure 1200, the system controller may use the shade-façade angle $\phi_{F-SHADE}$ of each of the motorized roller shades in the group to calculate the optimal shade group positions $P_{OPT-G}(t)$. For each interval (e.g., minute) between the start time $t_{START}$ and the end time $t_{END}$ of the timeclock schedule, the system controller may step through each of the motorized roller shades in the group and calculate the optimal shade position $P_{OPT}(t_{VAR})$ using the shade-façade angles $\phi_{F-SHADE}$ for the respective motorized roller shade. The system controller may use a variable n to keep track of which of the motorized roller shades is presently being analyzed (e.g., ranging from one up to the number $N_{SHADES}$ of motorized roller shades). Referring back to FIG. 17, the system controller may set the variable n equal to one at step 1214, and recall the shade-façade angle $\phi_{F-SHADE}$ for motorized roller shade n at step 1216. For example, the system controller may recall the shade-façade angle $\phi_{F-SHADE}$ of the first motorized roller shade in the group the first time step 1216 is executed.

At step 1218, the system controller may determine an optimal shade position $P_{OPT}(t_{VAR})$ that may be used in order to limit the sunlight penetration distance $d_{PEN}$ to the desired maximum sunlight penetration distance $d_{MAX}$ at the variable time $t_{VAR}$ and at the shade-façade angle $\phi_{F-SHADE}$ for motorized roller shade n and store the optimal shade position $P_{OPT}(t_{VAR})$ in memory. If there are more shades in the group (e.g., if the variable n is not equal to the number $N_{SHADES}$) at step 1220, the system controller may increment the variable n at step 1222, recall the shade-façade angle $\phi_{F-SHADE}$ for motorized roller shade n at step 1216, and determine the optimal shade position $P_{OPT}(t_{VAR})$ for motorized roller shade n at step 1218.

If there are not more motorized roller shades in the group (e.g., if the variable n is equal to the number $N_{SHADES}$) at step 1220, the system controller may determine at step 1224 a lowest optimal shade position $P_{LOW}$, for example, the lowest position of the optimal shade positions $P_{OPT}(t_{VAR})$ determined at step 1218 for the motorized roller shades of the group. At step 1226, the system controller may store the lowest optimal shade position $P_{LOW}$ in memory as the optimal shade group position $P_{OPT-G}(t_{VAR})$ at the variable time $t_{VAR}$ (e.g., to be used in the timeclock event creation procedure 1020 of the timeclock configuration procedure 1000 shown in FIG. 15). If the variable time $t_{VAR}$ is not equal to the end time $t_{END}$ at step 1228, the system controller may increment the variable time $t_{VAR}$ by one interval (e.g., minute) at step 1230 and determine the optimal shade group position $P_{OPT-G}(t_{VAR})$ for the plurality of motorized roller shades for the next variable time $t_{VAR}$ at step 1224. When the variable time $t_{VAR}$ is equal to the end time $t_{END}$ at step 1228, the optimal shade position procedure 1200 may exit.

Figure 18:
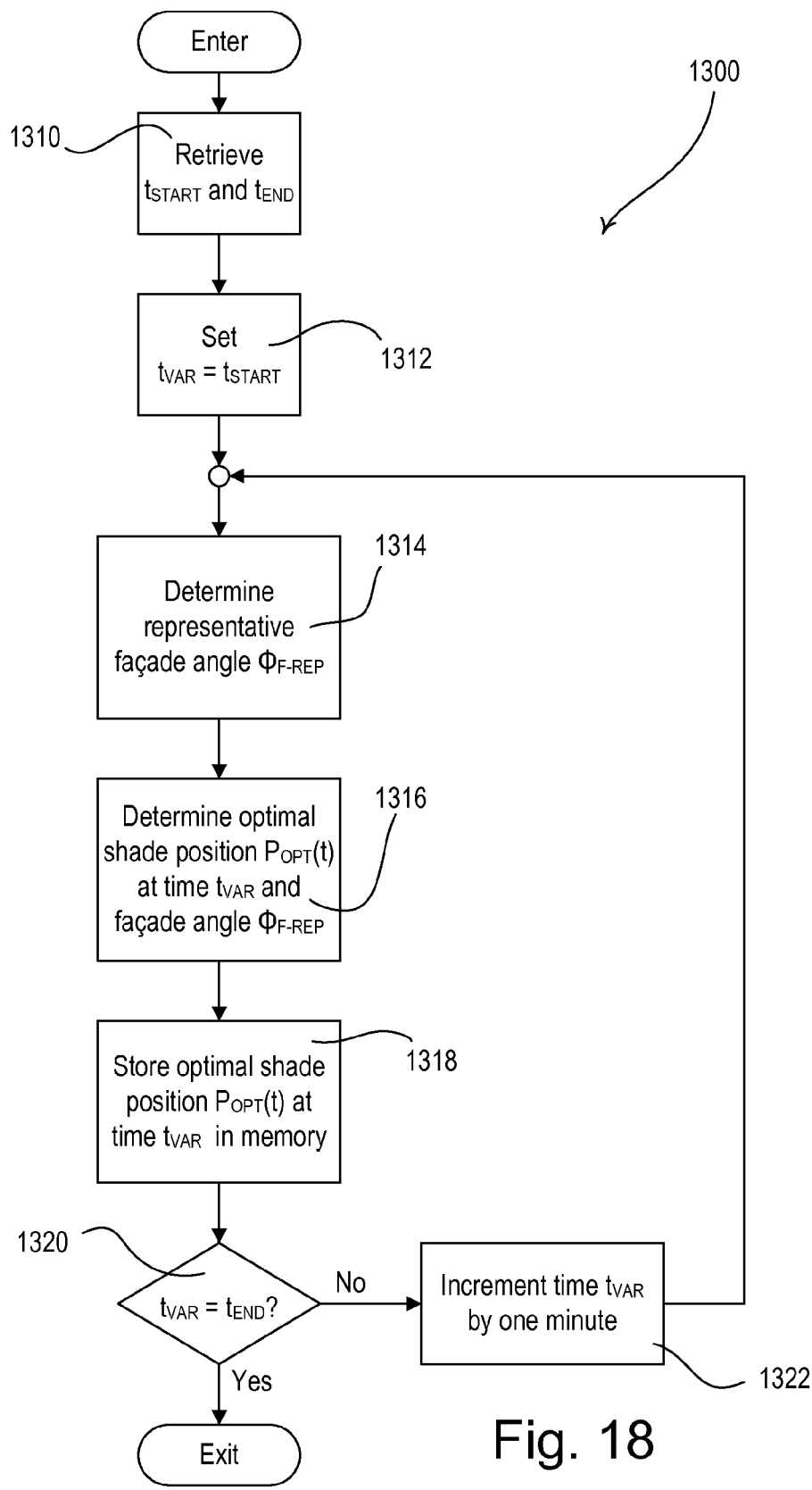

FIG. 18 is a simplified flowchart of another example optimal shade position procedure 1300 that may be executed by a system controller to determine optimal shade positions for a plurality of motorized window treatments (e.g., motorized roller shades) arranged along a non-linear façade (or multiple adjacent linear façades) of a building (e.g., executed by the shade controller 920 of the load control system 900 during the timeclock configuration procedure 1000 shown in FIG. 15). The system controller may retrieve a start time $t_{START}$ and an end time $t_{END}$ of a timeclock schedule for the present day at step 1310 and may set a variable time $t_{VAR}$ equal to the start time $t_{START}$ at step 1312. The system controller may determine a representative façade angle $\phi_{F-REP}$ for the non-linear façade at step 1314 using, for example, the solar azimuth angle $\phi_S$, the start façade angle $\phi_{START}$, and the end façade angle $\phi_{END}$. For example, the system controller may recalculate the representative façade angle $\phi_{F-REP}$ at each interval (e.g., minute) between the start time $t_{START}$ and the end time $t_{END}$ of the timeclock schedule.

At step 1316, the system controller may determine the optimal shade position $P_{OPT}(t_{VAR})$ of the motorized roller shades that will limit the sunlight penetration distance $d_{PEN}$ in the space to a desired maximum sunlight penetration distance $d_{MAX}$ at the variable time $t_{VAR}$ and the representative façade angle $\phi_{F-REP}$. At step 1318, the system controller may store the optimal shade position $P_{OPT}(t_{VAR})$ in memory as an optimal shade group position $P_{OPT-G}(t_{VAR})$ at the variable time $t_{VAR}$ (e.g., to be used in the timeclock event creation procedure 1020 of the timeclock configuration procedure 1000 shown in FIG. 15). If the variable time $t_{VAR}$ is not equal to the end time $t_{END}$ at step 1320, the system controller may increment the variable time $t_{VAR}$ by, for example, one minute at step 1322 and determine the optimal shade group position $P_{OPT-G}(t_{VAR})$ for the plurality of motorized roller shades for the next variable time $t_{VAR}$ at step 1316. When the variable time $t_{VAR}$ is equal to the end time $t_{END}$ at step 1320, the optimal shade position procedure 1300 may exit.

Figure 19:
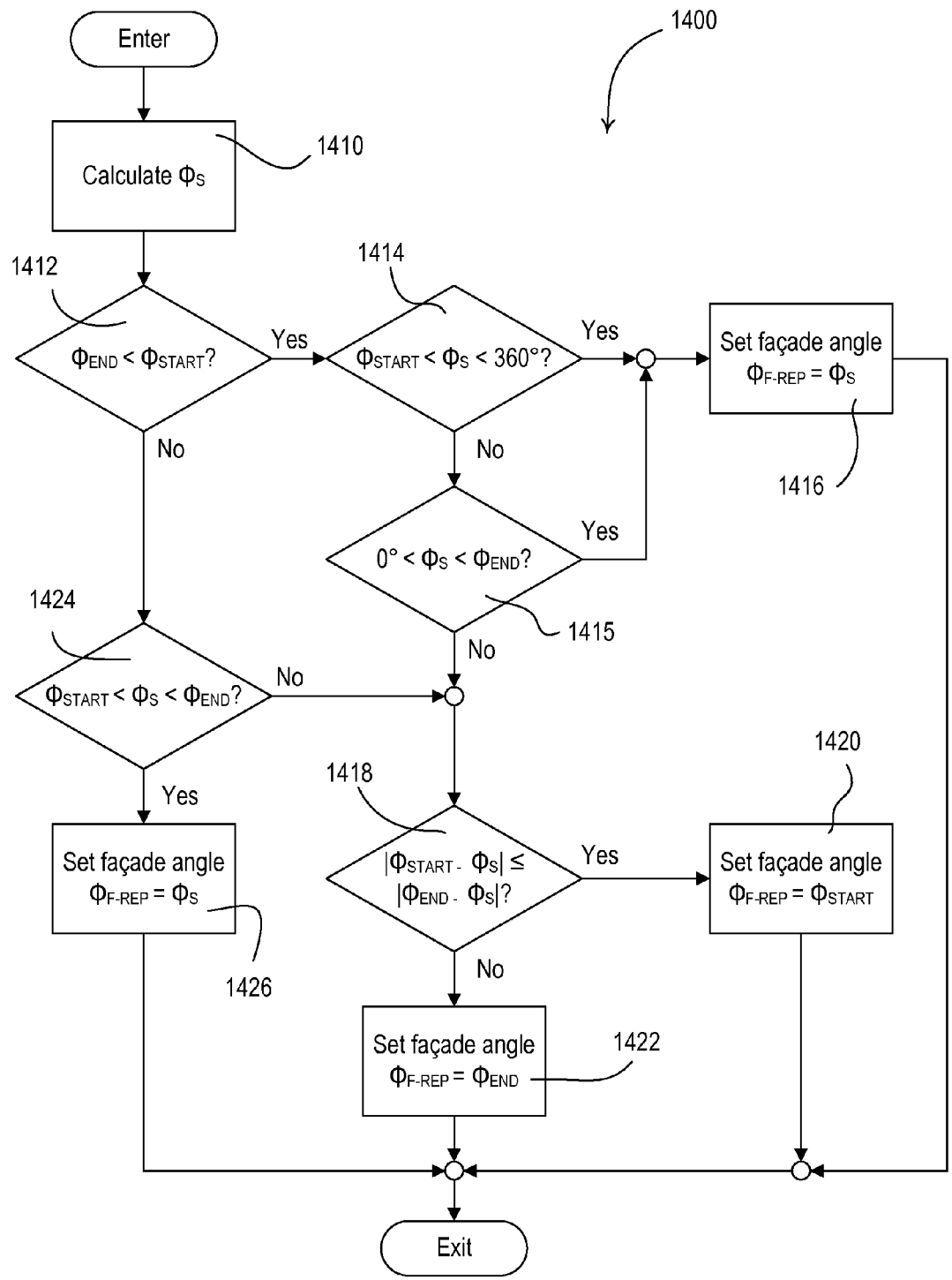
FIG. 19 is a simplified flowchart of an example representative façade angle determination procedure executed by a system controller (e.g., a shade controller) of a load control system.

FIG. 19 is a simplified flowchart of an example representative façade angle determination procedure 1400 that may be executed by a system controller of a load control system to determine a representative façade angle $\phi_{F-REP}$ for a plurality of motorized window treatments (e.g., motorized roller shades) arranged along a non-linear façade (or multiple adjacent linear façades) of a building. For example, the representative façade angle determination procedure 1400 may be executed by the shade controller 920 of the load control system 900 at step 1314 of the optimal shade position procedure 1300 shown in FIG. 18 to determine a representative façade angle $\phi_{F-REP}$ for a curved façade having a start façade angle $\phi_{START}$ and an end façade angle $\phi_{END}$. For example, the example representative façade angle determination procedure 1400 may be executed for each interval (e.g., minute) between the start time $t_{START}$ and the end time $t_{END}$ of the timeclock schedule.

As shown in FIG. 19, the system controller may calculate the solar azimuth angle $\phi_S$ at step 1410 (e.g., using the variable time $t_{VAR}$ from the optimal shade position procedure 1300). The system controller may determine if the curved façade is facing north (e.g., if the curved façade includes the façade angle of zero degrees) by determining the end façade angle $\phi_{END}$ and the start façade angle $\phi_{START}$ at step 1412 (e.g., if $\phi_{START} < \phi_S < 360°$ or $0° < \phi_S < \phi_{END}$). If the end façade angle $\phi_{END}$ is less than the start façade angle $\phi_{START}$ at step 1412 (e.g., the curved façade includes the façade angle of zero), the system controller may determine if the solar azimuth angle $\phi_S$ is between the start façade angle $\phi_{START}$ and the end façade angle $\phi_{END}$ by determining if the solar azimuth angle $\phi_S$ is between the start façade angle $\phi_{START}$ and 360° at step 1414 or if the solar azimuth angle $\phi_S$ is between 0° and the end façade angle $\phi_{END}$ at step 1415. If the solar azimuth angle $\phi_S$ is between the start façade angle $\phi_{START}$ and the end façade angle $\phi_{END}$ at steps 1414, 1415, the system controller may set the representative façade angle $\phi_{F-REP}$ equal to the solar azimuth angle $\phi_S$ at step 1416, and the façade angle determination procedure 1400 may exit.

If the solar azimuth angle $\phi_S$ is not between the start and end façade angles $\phi_{START}$, $\phi_{END}$ at steps 1414, 1415, the system controller may determine if the solar azimuth angle $\phi_S$ is closer to the start façade angle $\phi_{START}$ or the end façade angle $\phi_{END}$ at step 1418. If the solar azimuth angle $\phi_S$ is closer to the start façade angle $\phi_{START}$ (e.g., if $|\phi_{START} - \phi_S| \leq |\phi_{START} - \phi_S|$) at step 1418, the system controller may set the representative façade angle $\phi_{F-REP}$ equal to start façade angle $\phi_{START}$ at step 1420, before the façade angle determination procedure 1400 may exit. If the solar azimuth angle $\phi_S$ is closer to the end façade angle $\phi_{END}$ at step 1418, the system controller may set the representative façade angle $\phi_{F-REP}$ equal to end façade angle $\phi_{END}$ at step 1422, and the façade angle determination procedure 1400 may exit. The system controller may be configured to default to the start façade angle $\phi_{START}$ or the end façade angle $\phi_{END}$ when the solar azimuth angle $\phi_S$ is equidistant from each.

If the curved façade is not facing north at step 1412, the system controller may determine if the solar azimuth angle $\phi_S$ is between the start façade angle $\phi_{START}$ and the end façade angle $\phi_{END}$ (e.g., if $\phi_{START} < \phi_S < \phi_{END}$) at step 1424. If so, the system controller may set the representative façade angle $\phi_{F-REP}$ equal to the solar azimuth angle $\phi_S$ at step 1426, and the façade angle determination procedure 1400 may exit. If the solar azimuth angle $\phi_S$ is not between the start façade angle $\phi_{START}$ and the end façade angle $\phi_{END}$ at step 1424 and the solar azimuth angle $\phi_S$ is closer to the start façade angle $\phi_{START}$ at step 1418, the system controller may set the representative façade angle $\phi_{F-REP}$ equal to start façade angle $\phi_{START}$ at step 1420, before the façade angle determination procedure 1400 may exit. If the solar azimuth angle $\phi_S$ is closer to the end façade angle $\phi_{END}$ at step 1418, the system controller may set the representative façade angle $\phi_{F-REP}$ equal to end façade angle $\phi_{END}$ at step 1422, and the façade angle determination procedure 1400 may exit.

While north is characterized by a façade angle of zero degrees in the façade angle determination procedure 1400 of FIG. 19, another direction (e.g., south) may alternatively be assigned the façade angle of zero degrees (e.g., based on user preference).

While the present disclosure has been described with reference to the motorized roller shades 140, 910, the concepts disclosed herein could be applied to other types of motorized window treatments, such as motorized draperies, roman shades, Venetian blinds, tensioned roller shade systems, and roller shade systems having pleated shade fabrics. An example of a motorized drapery system is described in greater detail in commonly-assigned U.S. Pat. No. 6,994,145, issued Feb. 7, 2006, entitled MOTORIZED DRAPERY PULL SYSTEM, the entire disclosure of which is hereby incorporated by reference. An example of a tensioned roller shade system is described in greater detail in commonly-assigned U.S. Pat. No. 8,056,601, issued Nov. 15, 2011, entitled SELF-CONTAINED TENSIONED ROLLER SHADE SYSTEM, the entire disclosure of which is hereby incorporated by reference. An example of a roller shade system having a pleated shade fabric is described in greater detail in commonly-assigned U.S. Pat. No. 8,210,228, issued Jul. 3, 2012, entitled ROLLER SHADE SYSTEM HAVING A HEMBAR FOR PLEATING A SHADE FABRIC, the entire disclosure of which is hereby incorporated by reference.

Although features and elements are described herein in a particular combination or order, each feature or element can be used alone or in any combination or order with the other features and elements. The methods described herein may be implemented in a computer program, software, or firmware incorporated in a computer-readable medium for execution by a computer or processor. For example, the control devices (e.g., load control devices, system controller, etc.) may include a processor capable of executing instructions that may be stored on a computer-readable medium, such as a local or remote memory for example. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs). The control devices may communicate the instructions via digital messages that may be transmitted or received by a communication circuit, such as a transceiver for example.

What is claimed is:

1. A load control system for controlling an amount of daylight entering a space of a building through at least one window of a non-linear façade of the building, the non-linear façade characterized by at least two distinct façade angles, the load control system comprising:
   at least two motorized window treatments located along the non-linear façade for controlling the amount of daylight entering the space; and
   a system controller configured to transmit digital commands to the at least two motorized window treatments for controlling the at least two motorized window treatments, the system controller configured to:
      calculate a position for the at least two motorized window treatments at each of a plurality of different times during a time interval using the at least two distinct façade angles, the position calculated to prevent a sunlight penetration distance from exceeding a maximum sunlight penetration distance at each of the plurality of different times during the time interval;
      use the calculated positions at the plurality of different times during the time interval to determine a controlled position to which the at least two motorized window treatments will be controlled during the time interval; and
      automatically adjust the position of each of the at least two motorized window treatments to the controlled position so as to prevent the sunlight penetration distance from exceeding the maximum sunlight penetration distance during the time interval.

2. The load control system of claim 1, wherein the system controller is further configured to determine a representative façade angle for each of the plurality of different times during the time interval using the at least two distinct façade angles, and calculate the position for the at least two motorized window treatments at each of the plurality of different times during the time interval using the representative façade angle, the position calculated to prevent the sunlight penetration distance from exceeding the maximum sunlight penetration distance at each of the plurality of different times during the time interval.

3. The load control system of claim 2, wherein the at least two distinct façade angles comprise first and second façade angles, and the system controller is further configured to calculate a solar azimuth angle at each of the plurality of different times during the time interval, and set the representative façade angle equal to the solar azimuth angle if the solar azimuth angle is between the first and second façade angles.

4. The load control system of claim 3, wherein the system controller is further configured to set the representative façade angle equal to the first façade angle if the solar azimuth angle is not between the first and second façade angles and the solar azimuth angle is closer to the first façade angle than the second façade angle, and set the representative façade angle equal the second façade angle if the solar azimuth angle is not between the first and second façade angles and the solar azimuth angle is closer to the second façade angle than the first façade angle.

5. The load control system of claim 4, wherein the first and second façade angles comprise, respectively, a start façade angle and an end façade angle of a portion of the non-linear façade on which the at least two motorized window treatments are located.

6. The load control system of claim 3, wherein the system controller is further configured to calculate the solar azimuth angle at each of the plurality of different times during the time interval as a function of a longitude and a latitude of a location of the building, a present date, and each of the plurality of different times.

7. The load control system of claim 2, wherein the system controller is further configured to set the controlled position equal to a lowest one of the positions during the time interval.

8. The load control system of claim 1, wherein the system controller is further configured to calculate a first position for a first motorized window treatment arranged at a first façade angle at each of the plurality of different times during the time interval, and calculate a second position for a second motorized window treatment arranged at a second façade angle at each of the plurality of different times during the time interval.

9. The load control system of claim 8, wherein the system controller is further configured to determine a lowest position of the first and second positions for the respective motorized window treatments at each of the plurality of different times during the time interval, and set the controlled position equal to the lowest position of the first and second positions at each of the plurality of different times during the time interval.

10. The load control system of claim 9, wherein the first and second façade angles comprise, respectively, a start façade angle and an end façade angle of a portion of the non-linear façade on which the at least two motorized window treatments are located.

11. The load control system of claim 9, wherein the first and second façade angles comprise distinct angles at which the first and second motorized window treatment of the at least two motorized window treatments are oriented, respectively.

12. The load control system of claim 8, wherein the system controller is configured to:
calculate a third position for a third motorized window treatment at a third façade angle at each of the plurality of different times during the time interval;
determine a lowest position of the first, second, and third calculated positions for the respective first, second, and third motorized window treatments at each of the plurality of different times during the time interval; and
set the controlled position equal to the determined lowest position.

13. The load control system of claim 1, wherein the system controller is configured to:
calculate positions of the at least two motorized window treatment during a plurality of consecutive time intervals, where the positions are calculated for the plurality of consecutive time intervals to prevent the sunlight penetration distance from exceeding the maximum sunlight penetration distance during any of the consecutive time intervals;
determine respective controlled positions to which the at least two motorized window treatment should be controlled during the consecutive time intervals; and
automatically adjust the position of the at least two motorized window treatment to the calculated positions at a beginning of each time interval.

14. The load control system of claim 13, wherein the system controller is configured to build a timeclock schedule including a number of timeclock events each having an event time corresponding to the beginning of one of the time intervals and a respective event position corresponding to the respective controlled position of the respective time interval, the system controller further configured to automatically control the at least two motorized window treatments according to the timeclock schedule by adjusting the position of the at least two motorized window treatment to the respective event position of each of the timeclock events at the respective event time.

15. The load control system of claim 14, wherein the system controller is further configured to determine a minimum time period that may occur between any two consecutive timeclock events, each time interval having a length greater than or equal to the minimum time period that may occur between the any two consecutive window treatment movements.

16. The load control system of claim 13, wherein the system controller is further configured to calculate the positions of the at least two motorized window treatments as a function of a longitude and a latitude of a location of the building, a height of the at least one window, and a date and time.

17. The load control system of claim 1, wherein the at least two motorized window treatments comprise three or more motorized window treatments arranged at respective façade angles along the non-linear façade, the system controller configured to:
calculate a respective position for each of the three or more motorized window treatments at the respective façade angle at each of the plurality of different times during the time interval, the respective position calculated to prevent the sunlight penetration distance from exceeding the maximum sunlight penetration distance at each of the plurality of different times during the time interval;
determine a lowest position of the calculated respective positions for the three or more motorized window treatments at each of the plurality of different times during the time interval; and
set the controlled position equal to the lowest position at the plurality of different times during the time interval.

18. A method of automatically controlling at least two motorized window treatments located along a non-linear façade of a building, the non-linear façade characterized by at least two distinct façade angles, the method comprising:
calculating a position for the at least two motorized window treatments at each of a plurality of different times during a time interval using the at least two distinct façade angles, the position calculated to prevent a sunlight penetration distance from exceeding a maximum sunlight penetration distance at each of the plurality of different times during the time interval;
using the positions that were calculated at the plurality of different times during the time interval to determine a controlled position to which the at least two motorized window treatments will be controlled during the time interval; and
automatically adjusting the position of each of the at least two motorized window treatments to the controlled position so as to prevent the sunlight penetration distance from exceeding the maximum sunlight penetration distance during the time interval.

19. The method of claim 18, wherein calculating the position for the at least two motorized window treatments further comprises:
determining a representative façade angle at each of the plurality of different times during the time interval using the at least two distinct façade angles; and
calculating the position for the at least two motorized window treatments at each of the plurality of different times during the time interval using the representative façade angle, the position calculated to prevent the sunlight penetration distance from exceeding the maximum sunlight penetration distance at each of the plurality of different times during the time interval.

20. The method of claim 19, wherein the at least two distinct façade angles comprise first and second façade angles, and the step of determining the representative façade angle further comprises calculating a solar azimuth angle at each of the plurality of different times during the time interval, and setting the representative façade angle equal to the solar azimuth angle if the solar azimuth angle is between the first and second façade angles.

21. The method of claim 20, wherein the step of determining the representative façade angle further comprises setting the representative façade angle equal to the first façade angle if the solar azimuth angle is not between the first and second façade angles and the solar azimuth angle is closer to the first façade angle than the second façade angle, and setting the representative façade angle equal the second façade angle if the solar azimuth angle is not between the first and second façade angles and the solar azimuth angle is closer to the second façade angle than the first façade angle.

22. The method of claim 21, wherein the first and second façade angles comprise, respectively, a start façade angle and an end façade angle of a portion of the non-linear façade on which the at least two motorized window treatments are located.

23. The method of claim 20, wherein the step of calculating the solar azimuth angle further comprises calculating the solar azimuth angle at each of the plurality of different times during the time interval as a function of a longitude and a latitude of a location of the building, a present date, and each of the plurality of different times.

24. The method of claim 19, wherein the step of using the positions at the plurality of different times during the time interval to determine the controlled position to which the at least two motorized window treatments will be controlled during the time interval further comprises setting the controlled position equal to a lowest one of the positions during the time interval.

25. The method of claim 18, wherein calculating the position for the at least two motorized window treatments further comprises:
calculating a first position for a first motorized window treatment at a first façade angle at each of the plurality of different times during the time interval; and
calculating a second position for a second motorized window treatment at a second façade angle at each of the plurality of different times during the time interval.

26. The method of claim 25, wherein using the positions that were calculated at the plurality of different times during the time interval to determine the controlled position to which both of the motorized window treatments will be controlled during the time interval further comprises:
determining a lowest position of the first and second positions for the respective motorized window treatments at each of the plurality of different times during the time interval; and
setting the controlled position equal to the lowest position of the first and second positions at each of the plurality of different times during the time interval.

27. The method of claim 26, wherein the first and second façade angles comprise, respectively, a start façade angle and an end façade angle of a portion of the non-linear façade on which the at least two motorized window treatments are located.

28. The method of claim 26, wherein the first and second façade angles comprise distinct angles at which the first and second motorized window treatments are oriented, respectively.

29. The method of claim 25, wherein using the positions that were calculated at the plurality of different times during the time interval to determine a controlled position to which the at least two motorized window treatments will be controlled during the time interval further comprises:
calculating a third position for a third motorized window treatment at a third façade angle at each of the plurality of different times during the time interval;
determining a lowest position of the first, second, and third calculated positions for the respective first, second, and third motorized window treatments at each of the plurality of different times during the time interval; and setting the controlled position equal to the determined lowest position.

30. The method of claim 18, further comprising:
calculating positions of the at least two motorized window treatments during a plurality of consecutive time intervals, where the positions are calculated for the plurality of consecutive time intervals to prevent the sunlight penetration distance from exceeding the maximum sunlight penetration distance during any of the consecutive time intervals;
determining respective controlled positions to which the at least two motorized window treatments should be controlled during the consecutive time intervals; and
automatically adjusting the position of the at least two motorized window treatments to the calculated positions at a beginning of each time interval.

31. The method of claim 30, further comprising:
building a timeclock schedule including a number of timeclock events each having an event time corresponding to the beginning of one of the time intervals and a respective event position corresponding to the respective controlled position of the respective time interval; and
wherein the step of automatically adjusting the position of the at least two motorized window treatments to the calculated position comprises automatically controlling the at least two motorized window treatments according to the timeclock schedule by adjusting the position of the at least two motorized window treatments to the respective event position of each of the timeclock events at the respective event time.

32. The method of claim 31, further comprising:
determining a minimum time period that may occur between any two consecutive timeclock events; and
wherein each time interval has a length greater than or equal to the minimum time period that may occur between the any two consecutive window treatment movements.

33. The method of claim 30, wherein the step of calculating the position for the at least two motorized window treatments further comprises calculating positions of the at least two motorized window treatments as a function of a longitude and a latitude of a location of the building, a height of at least one window, and a date and time.

34. The method of claim 18, wherein the step of calculating the position for the at least two motorized window treatments further comprises:
calculating a respective position for each of the at least two motorized window treatments at a respective façade angle at each of the plurality of different times during the time interval, the respective position calculated for each of the at least two motorized window treatments to prevent the sunlight penetration distance from exceeding the maximum sunlight penetration distance at each of the plurality of different times during the time interval;
determining a lowest position of the respective positions for the at least two motorized window treatments at each of the plurality of different times during the time interval; and
setting the controlled position equal to the lowest position at each of the plurality of different times during the time interval.

* * * * *